United States Patent
Xue et al.

(10) Patent No.: US 12,507,286 B2
(45) Date of Patent: Dec. 23, 2025

(54) FBE-BASED LICENSED ASSISTED SIDELINK ACCESS

(71) Applicant: QUALCOMM Incorporated, San Diego, CA (US)

(72) Inventors: Yisheng Xue, San Diego, CA (US); Xiaoxia Zhang, San Diego, CA (US); Jing Sun, San Diego, CA (US); Ozcan Ozturk, San Diego, CA (US); Tao Luo, San Diego, CA (US); Juan Montojo, San Diego, CA (US); Peter Gaal, San Diego, CA (US); Changlong Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 543 days.

(21) Appl. No.: 17/921,084

(22) PCT Filed: May 2, 2020

(86) PCT No.: PCT/CN2020/088559
§ 371 (c)(1),
(2) Date: Oct. 24, 2022

(87) PCT Pub. No.: WO2021/223046
PCT Pub. Date: Nov. 11, 2021

(65) Prior Publication Data
US 2023/0171815 A1    Jun. 1, 2023

(51) Int. Cl.
*H04W 72/25* (2023.01)
*H04W 72/56* (2023.01)
(Continued)

(52) U.S. Cl.
CPC ....... *H04W 74/0866* (2013.01); *H04W 72/25* (2023.01); *H04W 72/56* (2023.01); *H04W 74/0816* (2013.01)

(58) Field of Classification Search
None
See application file for complete search history.

(56) References Cited

U.S. PATENT DOCUMENTS 10,863,492 B2    12/2020 Patel et al.
2017/0019886 A1*    1/2017 Patel ..................... H04W 76/14
(Continued)

FOREIGN PATENT DOCUMENTS

CN    107211430 A    9/2017
CN    107667565 A    2/2018
(Continued)

OTHER PUBLICATIONS

Ericsson: "On Mode 2 Resource Allocation for NR Sidelink," 3GPP Draft, 3GPP TSG-RAN WG1 Meeting #95, R1-1813641, Ericsson—On Mode 2 Resource Allocation for NR Side Link, 3rd Generation Partnership Project (3GPP), Mobile Competence Centre, 650, Route Des Lucioles, F-06921, Sophia-Antipolis Cedex, France, vol. Ran WG1, No. Spokane, WA, US, Nov. 12, 2018-Nov. 16, 2018, Nov. 11, 2018 (Nov. 11, 2018), XP051555699, 15 pages, section 5.3, the Whole Document.
(Continued)

*Primary Examiner* — Benjamin Lamont
(74) *Attorney, Agent, or Firm* — Loza & Loza, LLP

(57) ABSTRACT

Aspects of the disclosure relate to, at a wireless communication device, occupying a slot in a first subchannel, wherein the first subchannel comprises a sidelink subchannel in a licensed band, transmitting sidelink control in the first subchannel during the slot, except during a symbol gap indicated to include at least a last symbol of a plurality of symbols supported by the slot, seeking access to a secondary carrier in an unlicensed band, and transmitting sidelink traffic in the secondary carrier upon receiving the access to
(Continued)

the secondary carrier. Other aspects, embodiments, and features are also claimed and described.

28 Claims, 11 Drawing Sheets

(51) Int. Cl.
*H04W 74/08* (2009.01)
*H04W 74/0816* (2024.01)

(56) References Cited

U.S. PATENT DOCUMENTS

| | | | |
|---|---|---|---|
| 2017/0048038 A1* | 2/2017 | Seo | H04L 27/26 |
| 2017/0188391 A1* | 6/2017 | Rajagopal | H04W 74/0816 |
| 2017/0289869 A1* | 10/2017 | Nogami | H04W 36/0077 |
| 2017/0325216 A1 | 11/2017 | Nogami et al. | |
| 2018/0049143 A1* | 2/2018 | Gupta | H04W 16/14 |
| 2018/0124749 A1* | 5/2018 | Park | H04W 16/14 |
| 2019/0215693 A1 | 7/2019 | Lee et al. | |
| 2019/0261413 A1* | 8/2019 | Fodor | H04W 16/14 |
| 2019/0313354 A1 | 10/2019 | Gupta et al. | |
| 2020/0037336 A1 | 1/2020 | Sun et al. | |
| 2020/0053675 A1* | 2/2020 | Khoryaev | H04L 5/001 |
| 2020/0077434 A1* | 3/2020 | Kim | H04W 72/0446 |
| 2020/0107303 A1* | 4/2020 | Hahn | H04W 72/40 |
| 2020/0128580 A1* | 4/2020 | Lee | H04W 72/23 |
| 2020/0187208 A1* | 6/2020 | Hou | H04L 5/0069 |
| 2020/0337083 A1* | 10/2020 | Loehr | H04W 72/1263 |
| 2021/0014891 A1* | 1/2021 | Talarico | H04W 72/1273 |
| 2022/0131725 A1* | 4/2022 | Li | H04L 5/0048 |

FOREIGN PATENT DOCUMENTS

| | | |
|---|---|---|
| CN | 108886447 A | 11/2018 |
| WO | 2017011079 | 1/2017 |
| WO | 2017116108 A1 | 7/2017 |
| WO | 2018080365 A1 | 5/2018 |
| WO | 2018084524 A1 | 5/2018 |

OTHER PUBLICATIONS

International Search Report and Written Opinion—PCT/CN2020/088559—ISA/EPO—Feb. 2, 2021.
Supplementary European Search Report—EP20934517—Search Authority—The Hague—Dec. 13, 2023.
Zte, et al., "Discussion on NR Operation in Unlicensed Spectrum", 3GPP TSG RAN WG1 Meeting #88, R1-1701619—8.1.10 Discussion on NR Operation in Unlicensed Spectrum, 3rd Generation Partnership Project, Mobile Competence Centre, 650, Route Des Lucioles, F-06921 Sophia-Antipo, vol. RAN WG1, No. Athens, Greece, Feb. 13, 2017-Feb. 17, 2017, Feb. 12, 2017, XP051208786, 8 Pages.

* cited by examiner

FBE-BASED LICENSED ASSISTED SIDELINK ACCESS

CROSS-REFERENCE TO RELATED APPLICATIONS

This application is the U.S. national stage of PCT patent application number PCT/CN2020/088559 filed on May 2, 2020.

TECHNICAL FIELD

The technology discussed below relates generally to wireless communication systems, and more particularly to frame-based equipment (FBE) unlicensed band sidelink access that is assisted by sidelink in a licensed band.

INTRODUCTION

Scheduling access to licensed spectrum for sidelink communication between devices is performed efficiently. Presently, sidelink is used predominantly in the vehicle-to-vehicle (V2X) use case or domain. As sidelink use cases evolve in vertical domains other than the V2X domain, ever growing amounts of data transfer will present an increasing burden to the licensed spectrum, such as the Intelligent Transportation System (ITS) band presently handling V2X communication. Offloading of data to unlicensed spectrum is seen as one way to address the data bandwidth limitations of the licensed spectrum. However, scheduling access to unlicensed spectrum for sidelink communications is not as efficient as scheduling access to licensed spectrum for sidelink communications. The terms licensed spectrum, licensed band, and licensed bands may be used interchangeably. Likewise, the terms unlicensed spectrum, unlicensed band, and unlicensed bands may be used interchangeably.

As the demand for wireless communication increases, research and development continue to advance the communication technologies field. For example, techniques related to improved methods to schedule access to unlicensed spectrum for sidelink communication, between devices, may be useful, particularly for communications of all types between devices, where the communications are not necessarily scheduled by a network-type scheduling entity, such as, but not limited to, sidelink communications in the New Radio-Unlicensed (NR-U) domain.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example a method of wireless communication in a wireless communication network is disclosed. The method may include, at a wireless communication device, occupying a slot in a first subchannel, wherein the first subchannel comprises a sidelink subchannel in a licensed band, transmitting sidelink control in the first subchannel during the slot, except during a symbol gap indicated to include at least a last symbol of a plurality of symbols supported by the slot, seeking access to a secondary carrier in an unlicensed band, and transmitting sidelink traffic in the secondary carrier upon receiving the access to the secondary carrier.

In another example, a wireless communication device in a wireless communication network is disclosed. The wireless communication device includes a wireless transceiver, a memory, and a processor communicatively coupled to the wireless transceiver and the memory. According to one aspect, the processor and the memory may be configured to occupy a slot in a first subchannel, wherein the first subchannel comprises a sidelink subchannel in a licensed band, transmit sidelink control in the first subchannel during the slot, except during a symbol gap indicated to include at least a last symbol of a plurality of symbols supported by the slot, seek access to a secondary carrier in an unlicensed band, and transmit sidelink traffic in the secondary carrier upon receiving the access to the secondary carrier.

According to one aspect, a wireless communication device in a wireless communication network may include means for occupying a slot in a first subchannel, wherein the first subchannel comprises a sidelink subchannel in a licensed band, means for transmitting sidelink control in the first subchannel during the slot, except during a symbol gap indicated to include at least a last symbol of a plurality of symbols supported by the slot, means for seeking access to a secondary carrier in an unlicensed band, and means for transmitting sidelink traffic in the secondary carrier upon receiving the access to the secondary carrier.

In another example, an article of manufacture for use by a wireless communication device in a wireless communication network is described. The article of manufacture includes a non-transitory computer-readable medium having stored therein instructions executable by one or more processors of the wireless communication device. The instructions include instructions to occupy a slot in a first subchannel, wherein the first subchannel comprises a sidelink subchannel in a licensed band, transmit sidelink control in the first subchannel during the slot, except during a symbol gap indicated to include at least a last symbol of a plurality of symbols supported by the slot, seek access to a secondary carrier in an unlicensed band, and transmit sidelink traffic in the secondary carrier upon receiving the access to the secondary carrier.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 8A and FIG. 8B together constitute FIG. 8.

FIG. 10A and FIG. 10B together constitute FIG. 10.

DETAILED DESCRIPTION

Figure 1:
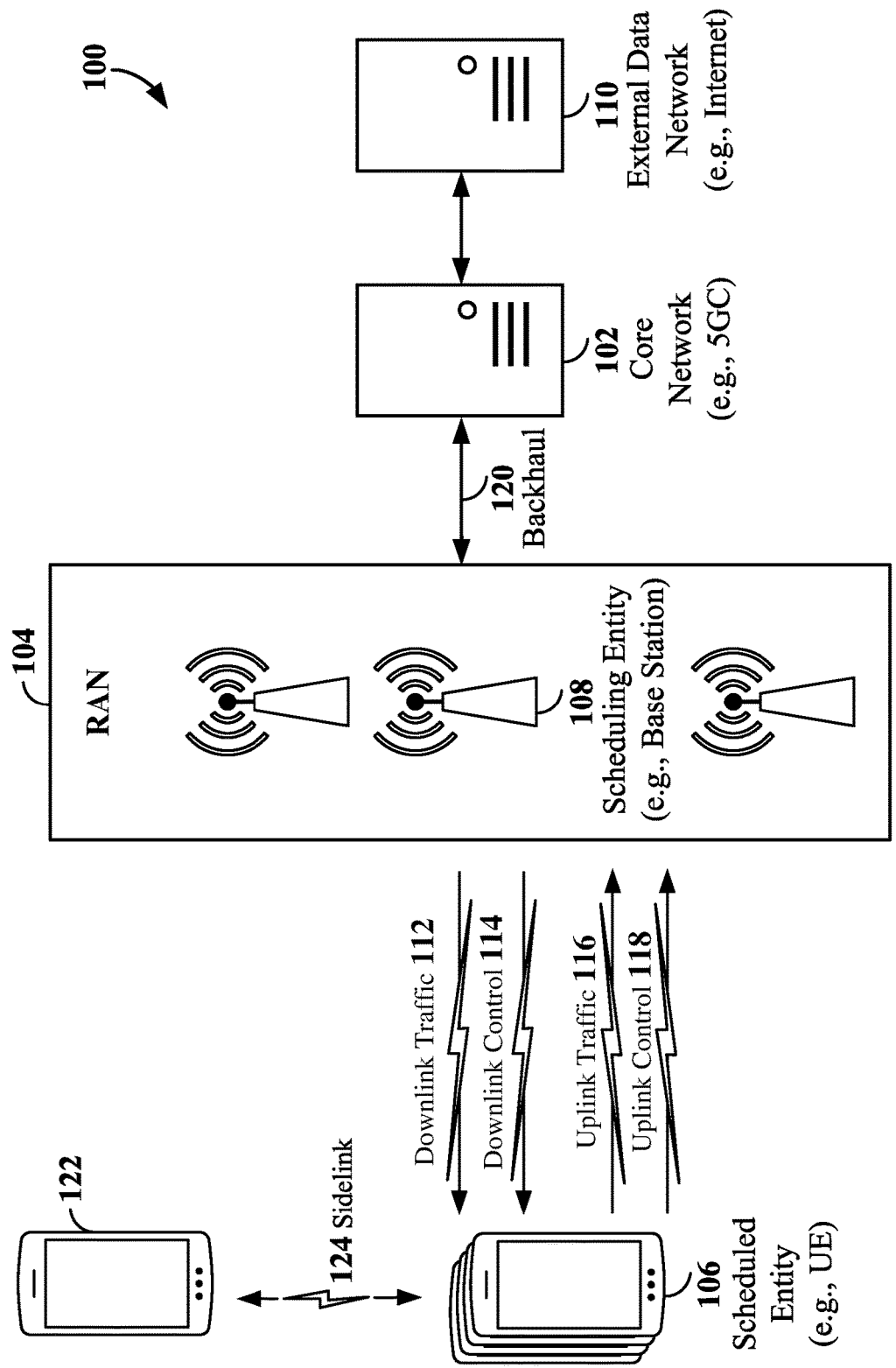
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Aspects described herein implement a heterogeneous carrier aggregation design for penetrating access control timing of New Radio Sidelink (NR SL) operating on a primary carrier in a licensed band to sidelink operating on a secondary carrier in an unlicensed band. The word heterogeneous is used to describe the design, which aggregates carriers from both the licensed and unlicensed spectrum together for one sidelink communication (e.g., one sidelink communication including sidelink control and sidelink traffic). As used herein, control refers to control messaging and traffic refers to non-control data, such as user data. Because the aggregated carriers are of two different types (e.g., carriers from licensed spectrum and carriers from unlicensed spectrum), the aggregation of the carriers is referred to as a heterogeneous aggregation. In contrast, a homogeneous aggregation would include carriers of only the licensed spectrum or carriers of only the unlicensed spectrum.

According to some aspects, there may be a benefit in offloading SL traffic from the primary carrier in the licensed band to the secondary carrier in the unlicensed band. For example, offloading the SL traffic may reduce some burden on the primary carrier by shifting the burden to the secondary carrier. As used herein, the primary carrier will refer to the carrier in the licensed band and the secondary carrier will refer to the carrier in the unlicensed band. According to aspects described herein, the primary carrier may carry all control information and the secondary carrier may carry traffic offloaded from the primary carrier. Furthermore, the secondary carrier may be relieved of any requirement for control, including, for example, sensing, resolution, access control, congestion control, and feedback. Instead, the aspects described herein may implement all control (including access control) for both the primary and secondary carriers to the primary carrier and shift all traffic from the primary carrier to the secondary carrier. In some aspects, the decisions made for the primary carrier may inform the decisions made for the secondary carrier.

Device-to-device communication, for example using sidelink, will become more frequent as time goes by. The $3^{rd}$ Generation Partnership Project (3GPP) standard setting body created standards and technical specification for sidelink in 4G Long Term Evolution (LTE). In support of the 5G rollout, 3GPP has also promulgated standards and specifications for sidelink in association with 5G standards. The exemplary processes and apparatus described herein may be described in terms of the 5G New Radio Sidelink (NR SL) standards; however, the disclosure is not limited to 5G NR or NR SL; the processes and apparatus described herein may find application with other wireless communication standards and specifications.

Presently, much work in NR SL is being performed in connection with Cellular Vehicle to Everything (C-V2X) (referred to generally herein as V2X) and/or Dedicated Short Range Communications (DSRC) use cases. These use cases may operate over licensed spectrum. For example, NR SL may operate in the ITS band (e.g., around 5.8-5.9 GHz) and/or in frequency spectrum owned by individual operators.

3GPP NR may further extend sidelink to other vertical domains (e.g., domains other than V2X). However, not every vertical domain can obtain or can have access to exclusive licensed spectrum like ITS or Industrial Internet of Things (IIoT) that is being used, for example, in Germany.

More users will benefit from sidelink if it could be used in unlicensed spectrum. To that end, 3GPP is currently promulgating standards and specifications for New Radio-Unlicensed (NR-U) operations, which provide, among other things, standards for use of sidelink in the unlicensed frequency bands.

ETSI has specified two channel access methodologies for unlicensed spectrum (e.g., the unlicensed 5 GHz band). The methodologies are referred to as load-based equipment (LBE) access and the frame-based equipment (FBE) access. LBE has been the dominating methodology due to its support for asynchronous channel access. LBE has been adopted by WiFi, 3GPP Licensed Assisted Access (LAA), and 3GPP NR-U. However, LBE is not considered to be "friendly" to Coordinated Multi-Point (CoMP) schemes and CoMP-like scheme that make use of simultaneous synchronous access from multiple nodes. This is unfortunate for NR SL, which has, to date, relied on a synchronous channel access engine at each UE.

FBE may be less-capable than other access schemes (like LBE) for the Uu interface yet shows good results for the PC-5 interface and for channel access in the unlicensed spectrum (e.g., the unlicensed 5 GHz band).

There are at least two reasons why FBE has not been adopted for the Uu interface. First, several FBE gNBs are not able to compete for airtime with the same number of LBE gNBs. However, this is not the case for SL because SL UEs are not competing with gNBs for airtime. Instead, they are competing for airtime among themselves. Second, competition among several FBE gNBs can lead to an unstable system. However, the aspects described herein may solve the problem of instability by arranging SL communication (e.g., coordinating SL communication) using a licensed SL carrier. Aspects described herein may overcome the obstacles found with FBE by using timing from channel access in a primary carrier in the licensed band to derive timing for FBE-based access over a secondary carrier in the unlicensed band.

The various concepts presented throughout this disclosure may be implemented across a broad variety of telecommunication systems, network architectures, and communication standards. Referring now to FIG. 1, as an illustrative example without limitation, a schematic illustration of a wireless communication system 100 according to some aspects is provided. Various aspects of the present disclosure are illustrated with reference to the wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3GPP New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of scheduling entities (schematically illustrated as scheduling entity 108) also referred to herein as base stations or network access nodes. Broadly, a base station or network access node is a network element in a radio access network responsible for radio transmission and reception in one or more cells to or from a UE. In different technologies, standards, or contexts, a scheduling entity may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant quality of service (QoS) for transport of critical service data.

Wireless communication between the RAN 104 and the UE 106 may be described as utilizing an air interface. Transmissions over the air interface from a base station (e.g., scheduling entity 108) to one or more UEs (e.g., similar to UE 106) may be referred to as downlink (DL) transmission. In accordance with certain aspects of the present disclosure, the term downlink may refer to a point-to-multipoint transmission originating at a scheduling entity 108 (described further below; e.g., base station). Another way to describe this scheme may be to use the term broadcast channel multiplexing. Transmissions from a UE (e.g., UE 106) to a scheduling entity 108 (e.g., a base station) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity 108 (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, a plurality of UEs (e.g., a plurality of UE 106), which may be scheduled entities, may utilize resources allocated by the scheduling entity 108.

Base stations, represented in both the singular and the plural by scheduling entity 108, are not the only entities that may function as scheduling entities. That is, in some examples, a UE may function as a scheduling entity, scheduling resources for one or more scheduled entities (e.g., one or more other UEs). For example, UE 106 may function as a scheduling entity while the UE 122 may function as scheduled entities. The communication between UE 106 and UE 122 may be referred to as sidelink 124, which is described in connection with FIG. 2 herein.

As illustrated in FIG. 1, a scheduling entity 108 may broadcast downlink traffic 112 and downlink control information 114 to one or more scheduled entities (e.g. one or more UE 106). Broadly, the scheduling entity 108 is a node or device responsible for scheduling traffic in a wireless communication network, including the downlink traffic 112 and, in some examples, uplink traffic 116 and uplink control 118 from one or more scheduled entities (e.g. one or more UE 106) to the scheduling entity 108. On the other hand, the scheduled entity (e.g. one or more UE 106) is a node or device that receives downlink control information 114, including but not limited to scheduling information (e.g., a grant), synchronization or timing information, or other control information from another entity in the wireless communication network such as the scheduling entity 108.

In general, scheduling entities, as graphically represented in the singular and plural by scheduling entity 108, may include a backhaul interface for communication with a backhaul portion 120 of the wireless communication system 100. The backhaul portion 120 may provide a link between a scheduling entity 108 and the core network 102. Further, in some examples, a backhaul network may provide interconnection between the respective base stations (each similar to scheduling entity 108). Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
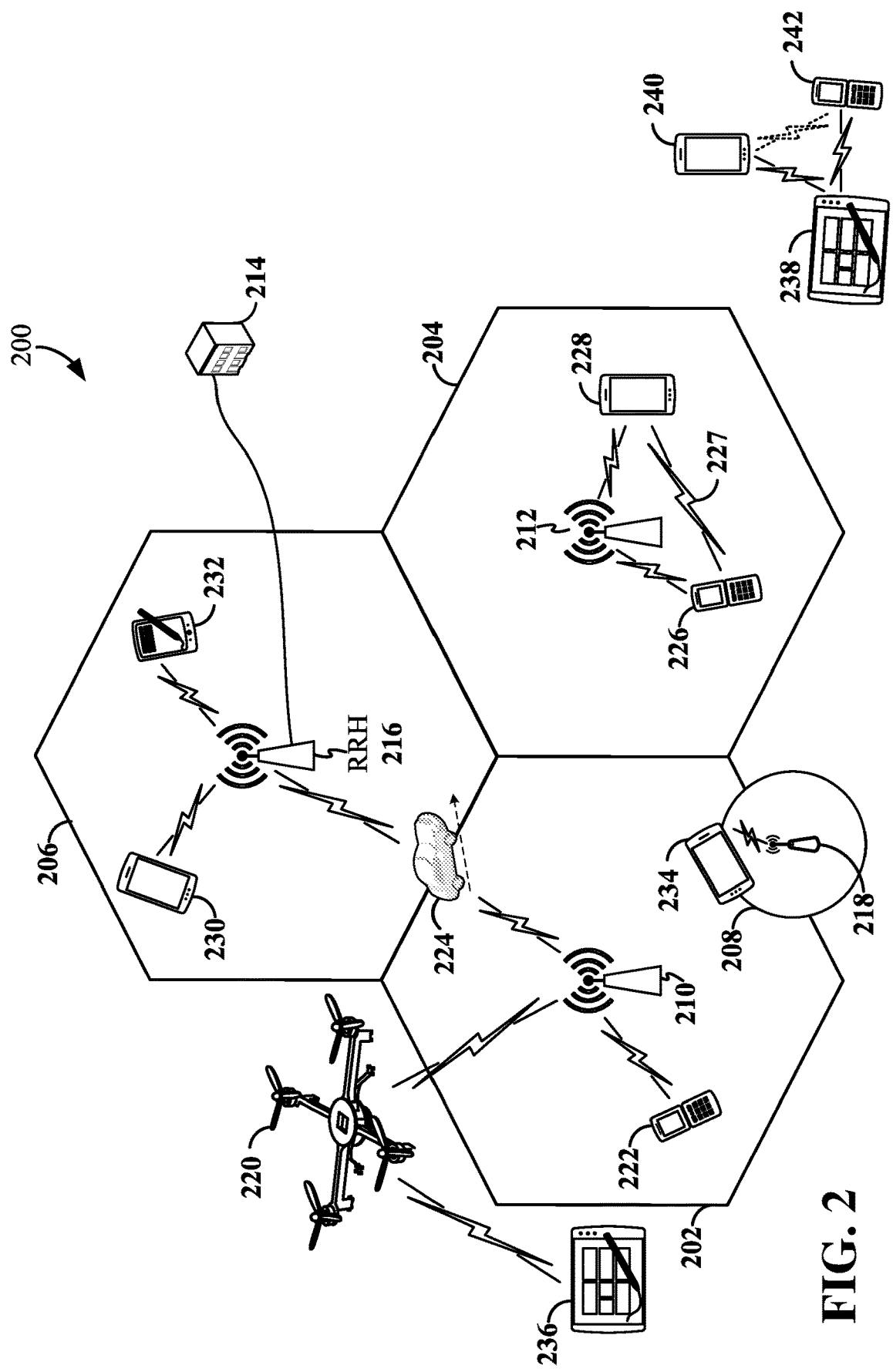
FIG. 2 is a schematic illustration of a radio access network (RAN) according to some aspects.

The various concepts presented throughout this disclosure may be implemented across a broad variety of telecommunication systems, network architectures, and communication standards. Referring now to FIG. 2, as an illustrative example without limitation, a schematic illustration of a radio access network (RAN) 200 according to some aspects is provided. Various aspects of the present disclosure are illustrated with reference to the RAN 200. The RAN 200 may implement any suitable wireless communication technology or technologies to provide radio access. As one example, the RAN 200 may operate according to $3^{rd}$ Generation Partnership Project (3GPP) New Radio (NR) specifications, often referred to as 5G. As another example, the RAN 200 may operate under a hybrid of 5G NR and Evolved Universal Terrestrial Radio Access Network (eU-TRAN) standards, often referred to as LTE. The 3GPP refers to this hybrid RAN as a next-generation RAN, or NG-RAN. Of course, many other examples may be utilized within the scope of the present disclosure.

The geographic region covered by the RAN 200 may be divided into a number of cellular regions (cells) that can be uniquely identified by a user equipment (UE) based on an identification broadcasted over a geographical area from one base station (e.g., an access point (AP), a network access node). FIG. 2 illustrates cells 202, 204, 206, and 208, each of which may include one or more sectors (not shown). Cells 202, 204, and 206 may be referred to as macrocells and cell 208 may be referred to as a small cell. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna, or array of antennas, responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a network access node, a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 2, two base stations, base station 210 and base station 212 are shown in cells 202 and 204; and a third base station, base station 214, is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208 (e.g., a small cell, a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints. It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses.

FIG. 2 further includes a quadcopter or drone, which may be configured to function as a base station, or more specifically as a mobile base station 220. That is, in some examples, a cell may not necessarily be stationary, and the geographic area of the cell may move according to the location of a mobile base station 220 such as a quadcopter, drone, or backpack base station.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 200 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 200, the cells may include UEs that may be in communication with one or more sectors of each cell. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. Here, each base station 210, 212, 214, 218, and 220 may be configured to provide an access point to a core network (not shown) for all the UEs in the respective cells. In another example, the mobile base station 220 (e.g., the quadcopter) may be configured to function as a UE. For example, the mobile base station 220 may operate within cell 202 by communicating with base station 210.

Wireless communication between a RAN 200 and a UE (e.g., UE 222 or 224) may be described as utilizing an air interface. Transmissions over the air interface from a base station (e.g., base station 210) to one or more UEs (e.g., UE 222 and 224) may be referred to as downlink (DL) transmission. In accordance with certain aspects of the present disclosure, the term downlink may refer to a point-to-multipoint transmission originating at a scheduling entity (described further below; e.g., base station 210). Another way to describe this scheme may be to use the term broadcast channel multiplexing. Transmissions from a UE (e.g., UE 222) to a base station (e.g., base station 210) may be referred to as uplink (UL) transmissions. In accordance with further aspects of the present disclosure, the term uplink may refer to a point-to-point transmission originating at a scheduled entity (described further below; e.g., UE 222).

For example, DL transmissions may include unicast or broadcast transmissions of control information and/or traffic information (e.g., user data traffic) from a base station (e.g., base station 210) to one or more UEs (e.g., UEs 222 and 224), while UL transmissions may include transmissions of control information and/or traffic information originating at a UE (e.g., UE 222). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. According to some aspects, a slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 200 may utilize one or more multiplexing and multiple access algorithms to enable simultaneous communication of the various devices. For example, 5G NR specifications provide multiple access for UL or reverse link transmissions from UEs 222 and 224 to base station 210, and for multiplexing DL or forward link transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the RAN 200, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 may move from the geographic area corresponding to its serving cell, cell 202, to the geographic area corresponding to a neighbor cell, cell 206. When the signal strength or quality from the neighbor cell, cell 206, exceeds that of its serving cell, cell 202, for a given amount of time, the UE 224 may transmit a reporting message to its serving base station, base station 210, indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, UE 238 is illustrated communicating with UEs 240 and 242. In some examples, the UE 238 is functioning as a scheduling entity, while the UEs 240 and 242 may function as scheduled entities. In other examples, sidelink or other type of direct link signals may be communicated directly between UEs without necessarily relying on scheduling or control information from another entity. In one example, two or more UEs (e.g., UEs 226 and 228) may communicate with each other using direct link signals 227 (e.g., sidelink, Bluetooth, and/or other types of direct link signals) without relaying that communication through a base station (e.g., base station 212). In another example, UEs 238, 240, and 242 may communicate over a direct link in a device-to-device (D2D), peer-to-peer (P2P), vehicle-to-vehicle (V2V) network, vehicle-to-everything (V2X), and/or in a mesh network. In a mesh network example, UEs 240 and 242 may optionally communicate directly with one another in addition to communicating with a scheduling entity (e.g., UE 238).

In some examples, UE 238 may be a transmitting sidelink device that reserves resources on a sidelink carrier for the transmission of sidelink signals to UEs 240 and 242 in a D2D or V2X network. Here, UEs 240 and 242 are each receiving sidelink devices. UEs 240 and 242 may, in turn, reserve additional resources on the sidelink carrier for subsequent sidelink transmissions.

In other examples, UEs 238, 240, and 242 may be P2P devices (e.g., Bluetooth, Zigbee, or Near Field Communication (NFC) devices) communicating over a P2P carrier. For example, UEs 238, 240, and 242 may be Bluetooth devices that communicate over a short-wavelength (e.g., 2.45 GHz) carrier. Each Bluetooth device (e.g., UEs 238, 240, and 242) may operate at low power (e.g., 100 mW or less) to communicate over a short-range distance (e.g., 10 meters or less). In a Bluetooth network, the UEs 238, 240, and 242 may form an ad-hoc piconet and each pair of UEs (e.g., UEs 238 and 240; UEs 238 and 242; and UEs 240 and 242) may communicate over a different frequency in a frequency-hopping manner. Within the piconet, one of the UEs (e.g., UE 238) may function as the master, while the other UEs (e.g., UEs 240 and 242) function as slaves. Each of the UEs 238, 240, and 242 may automatically detect and connect to one another.

In some examples, two or more UEs (e.g., UEs 226 and 228) within the coverage area of a serving base, such as base station 212, may communicate with both the base station 212 using cellular signals and with each other using direct link signals 227 (e.g., sidelink, Bluetooth, and/or other types of direct link signals) without relaying that communication through the base station 212. In an example of a V2X network within the coverage area of the base station 212, the base station 212 and/or one or both of the UEs 226 and 228 may function as scheduling entities to schedule sidelink communication between UEs 226 and 228.

Two primary technologies that may be used by V2X networks include dedicated short-range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to direct link (e.g., sidelink) networks other than V2X networks.

Figure 3:
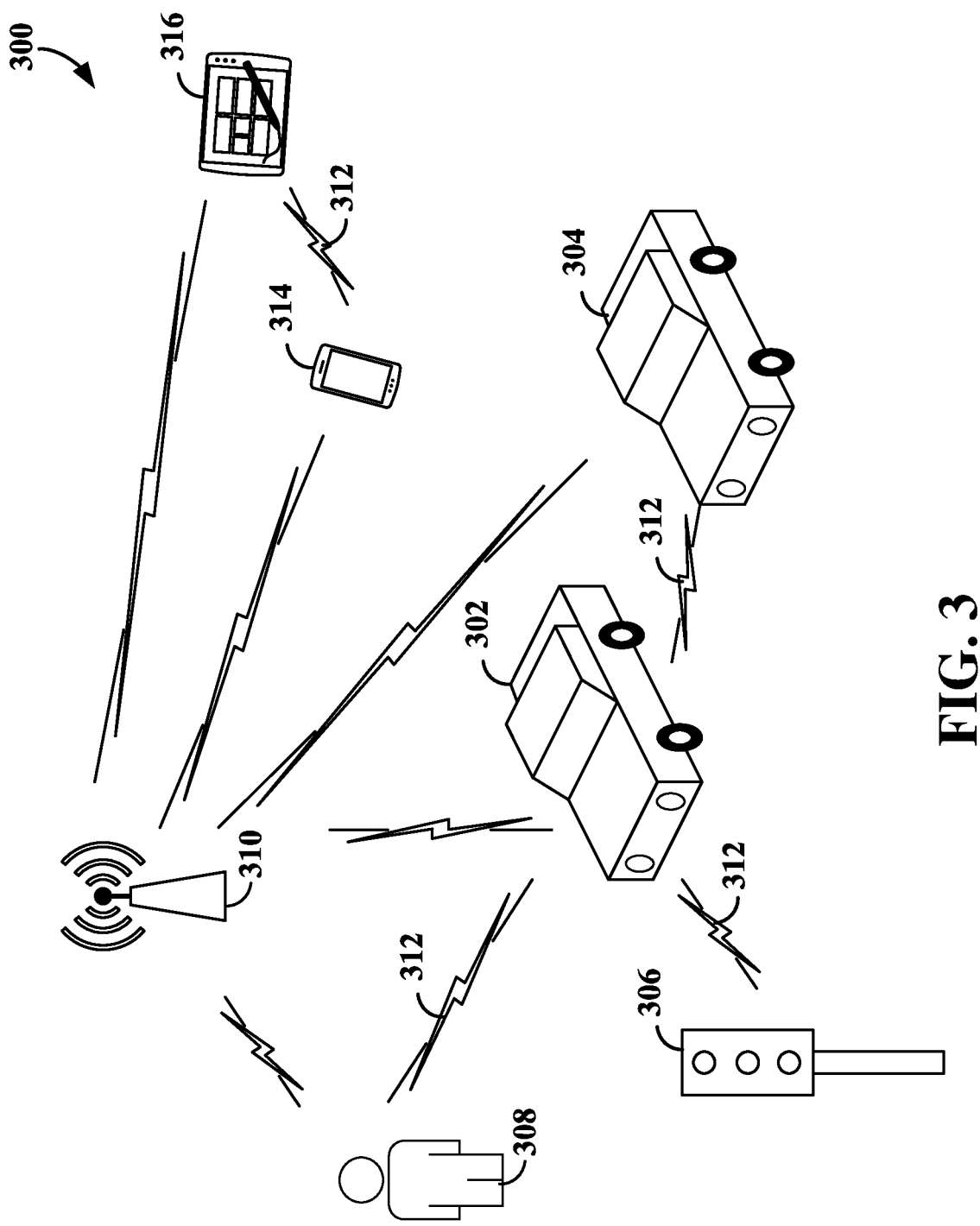
FIG. 3 illustrates an example of a wireless communication network 300 configured to support device-to-device (D2D) (e.g., sidelink) communication according to some aspects.

FIG. 3 illustrates an example of a wireless communication network 300 configured to support device-to-device (D2D) (e.g., sidelink) communication according to some aspects. In some examples, sidelink communication may include V2X communication. V2X communication involves the wireless exchange of information directly between not only vehicles (e.g., vehicles 302 and 304) themselves, but also directly between vehicles 302/304 and infrastructure 306, such as streetlights, buildings, traffic cameras, tollbooths or other stationary objects, vehicles 302/304 and mobile devices of pedestrians/cyclists 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

A V2X transmissions may include, for example, unicast transmissions, groupcast transmissions, and broadcast transmissions. Unicast describes a transmission, for example, from a vehicle (e.g., vehicle 302) to one other vehicle (e.g., vehicle 304). Groupcast arises when a group of UEs (e.g., vehicles 302 and 304) form a cluster. Data may be groupcasted within the cluster. Broadcast describes a transmission from, for example, a UE (e.g., vehicle 302) to surrounding receivers (e.g., vehicle 304, infrastructure 306 (e.g., an RSU), mobile devices of pedestrians/cyclists 308, the base station 310 of a network, or any combination thereof) in proximity to the transmitting UE.

V2X communication enable vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicles 302 and 304 or between a vehicle 302 or 304 and either infrastructure 306 or a pedestrian/cyclist 308 occurs over a proximity service (ProSe) PC5 interface 312. In various aspects of the disclosure, the PC5 interface 312 or other direct interface may further be utilized to support D2D communication in other proximity use cases. Examples of other proximity use cases may include public safety or commercial (e.g., entertainment, education, office, medical, and/or interactive)

based proximity services. As used herein, the term proximity service (ProSe) communication refers to the direct (e.g., D2D) communication between UEs in proximity use cases other than V2X. In the example shown in FIG. 3, direct (e.g., ProSe) communication may occur between UEs 314 and 316.

ProSe communication may support different operational scenarios, such as in-coverage, out-of-coverage, and partial coverage. Out-of-coverage refers to a scenario in which UEs 314 and 316 are outside of the coverage area of a base station (e.g., base station 310), but each are still configured for ProSe communication. Partial coverage refers to a scenario in which one of the UEs (e.g., UE 316) is outside of the coverage area of a base station (e.g., base station 310), while the other UE (e.g., UE 314) is in communication with the base station 310. In-coverage refers to a scenario in which UEs 314 and 316 are in communication with the base station 310 (e.g., gNB) via a Uu (e.g., cellular interface) connection to receive ProSe service authorization and provisioning information to support ProSe operations.

Various aspects of the present disclosure will be described with reference to an OFDM waveform, schematically illustrated in FIG. 4. It should be understood by those of ordinary skill in the art that the various aspects of the present disclosure may be applied, for example, to a DFT-s-OFDMA or an SC-FDMA waveform in substantially the same way as described herein below. That is, while some examples of the present disclosure may focus on an OFDM link for clarity, it should be understood that the same principles may be applied as well to DFT-s-OFDMA or SC-FDMA waveforms.

Figure 4:
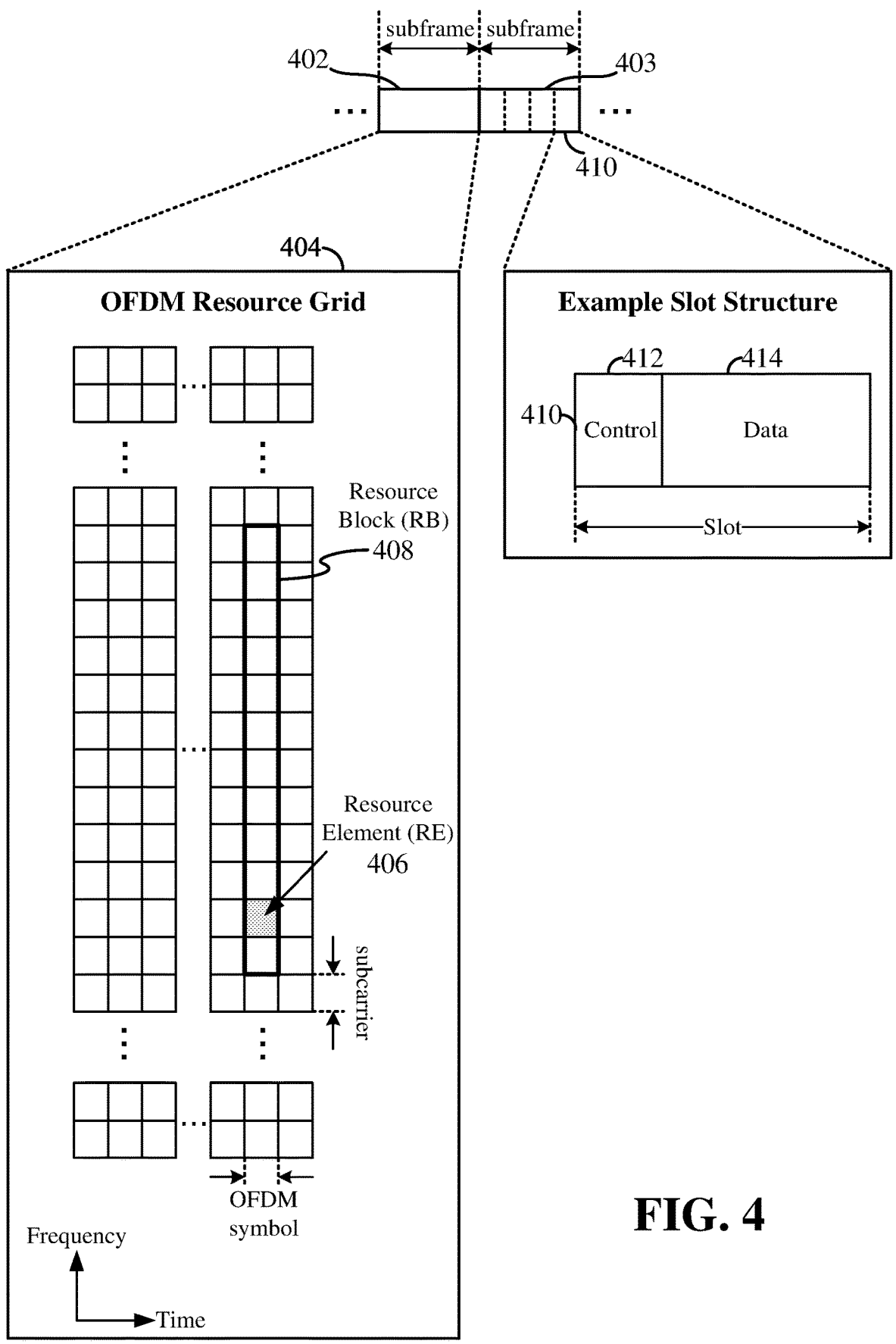
FIG. 4 is a schematic illustration of an organization of wireless resources in an air interface utilizing orthogonal frequency divisional multiplexing (OFDM) according to some aspects.

Referring now to FIG. 4, an expanded view of an exemplary subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

Scheduling of UEs or sidelink devices (hereinafter collectively referred to as wireless communication devise or SL UEs) for downlink, uplink, or sidelink transmissions typically involves scheduling one or more resource elements 406 within one or more sub-bands. Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

According to some examples, a frame may refer to a duration of 10 ms, with each frame sub-divided into 10 subframes 402 of 1 ms each. Each 1 ms subframe may consist of one or multiple adjacent slots. In the example shown in FIG. 4, subframe 403 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., 1, 2, or 3 OFDM symbols). These mini-slots, or shortened TTIs, may in some cases be transmitted occupying resources scheduled for ongoing slot transmissions for the same or for different UEs. Any number of resource blocks may be utilized within a subframe or slot.

An expanded view of one of the slots 410 illustrates the slot as including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In some examples, the slot 410 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities (e.g., UEs). The PCFICH provides information to assist a receiving device in receiving and decoding the PDCCH. The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the scheduled entity may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), or any other suitable UCI.

In addition to control information, one or more REs 406 (e.g., within the data region 414) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry system information blocks (SIBs), carrying information that may enable access to a given cell.

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., V2X or other sidelink device) towards a set of one or more other receiving sidelink devices. The PSCCH may include HARQ feedback information (e.g., ACK/NACK) that may be used to indicate a need, or lack of need, for retransmissions on the sidelink. The data region 414 of the slot 410 may include a physical sidelink shared channel (PSSCH) including the data transmitted by the initiating (transmitting) sidelink device within resources reserved over the sidelink carrier by the transmitting sidelink device.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above and illustrated in FIG. 1, FIG. 2, and FIG. 3 are not necessarily all the channels or carriers that may be utilized between a scheduling entity 108 and scheduled entities (e.g., one of more UE 106, 122), and those of ordinary skill in the art will recognize that other channels or carriers may be utilized in addition to those illustrated, such as other traffic, control, and feedback channels. For example, a UE, such as UE 106 may communicate with a second UE 122 via a sidelink 124 communication (e.g. a scheduled-entity-to-scheduled entity communication), for example, over a PC5 interface. The sidelink 124 communication may be carried, for example, in a licensed frequency domain using radio resources operating according to a 5G NR or NR SL specification and/or in an unlicensed frequency domain, using radio resources operating according to 5G new radio-unlicensed (NR-U) specifications.

In 5G NR, there may be four resource allocation modes of operation for sidelink (e.g., PC5) communications. In a first mode, Mode 1, a network access node (e.g., gNB) may allocate resources to wireless communication devices for sidelink communications between the wireless communication devices. In a second mode, Mode 2, the wireless communication devices may autonomously select sidelink resources for its own use. Signaling on the sidelink is the same between the two modes. Mode 3 and Mode 4 are generally directed to V2X, with Mode 4 being directed to self-scheduling of resources. Although Modes 3 and 4 are directed to V2X, the disclosures made herein may have applicability to at least Mode 2 and Mode 4. From a receiver's point of view, there is no difference between the four modes.

In Mode 1, the network access node may provide resources in at least two ways. A first way may include having the network access node provide resources dynamically (e.g., a dynamic grant) to wireless communication devices, in response to requests for sidelink resources from wireless communication devices. In a second way, the network access node may activate preconfigured sidelink grants for sidelink communication among wireless communication devices. In Mode 1, sidelink feedback may be reported back to the network access node by a transmitting wireless communication device.

In Mode 2, a wireless communication device may schedule sidelink communication (e.g., PC5) by use of a sidelink control information (SCI) message. SCI may be produced in two stages. Stage 1 sidelink control information may be referred to as SCI-1 herein. Stage 2 sidelink control information may be referred to as SCI-2 herein.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may identify a priority level of a payload. For example, ultra-reliable-low-latency communication (URLLC) traffic has a higher priority than text message traffic (e.g., short message service (SMS) traffic). SCI-1 may also include a physical sidelink shared channel (PSSCH)

resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2 message, for example, SCI-1 may disclose the size of SCI-2 by indicating an amount of time-frequency resources that are allotted for SCI-2, a number of a PSSCH DMRS port(s), and a modulation and coding scheme (MCS) index. SCI-1 may include other information that is useful for establishing and decoding a PSSCH resource.

SCI-2 may also be transmitted on the PSCCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). SCI-2 may include other information that is useful for establishing and decoding a PSSCH resource.

Licensed use of sidelink in 5G (via NR SL standards) does provide a channel access scheme (e.g., sensing, reservation, and channel busy ratio (CBR) based QoS management). However, unlicensed use of sidelink (via NR-U) does not provide the same channel access scheme. For example, NR SL (e.g., as used for V2X) employs subchannel selection-based sensing, which is different from the NR-U Listen Before Talk (LBT)-type sensing. Moreover, these two types of sensing are not able to be integrated with one another.

The types of sensing, resolution, and QoS management used for NR-U (e.g., for V2X in the unlicensed spectrum) are less efficient than the types of sensing, resolution, and QoS management used for NR SL (e.g., sidelink in the licensed spectrum); accordingly, a UE communicating using sidelink in a wireless communications network under NR-U may use more processor time and overall power consumption to secure a subchannel in an unlicensed band (e.g., using a listen before talk (LBT) based sensing access scheme) in comparison to the same UE's use of processing time and overall power consumption to secure a subchannel in a licensed band (e.g., using a subchannel selection based sensing access scheme). Furthermore, when using an LBT type of access scheme, even if a UE carefully selects subchannel in an unlicensed band, the selected subchannel can become unavailable (become invalid) in a last second before the UE's transmission on the selected subchannel. This may be true because another UE, unaware of the first UE's intent to use the subchannel, starts transmitting on the subchannel. As used herein, the phrase "at the last second" is meant to mean at a last instant of time prior to a transmission by a UE. The last instant of time may be measured, not in seconds, but in, for example, transmission time intervals, slot durations, or even OFDM symbol durations. The inefficiency caused by use of the LBT access scheme again results in a waste of processor time and overall power consumption in comparison to the same UE attempting to secure a similar subchannel in a licensed band. The additional processing time, receiver operation time (for use of LBT-based channel access), and transmitter time (in the case of transmitted traffic or data colliding with traffic or data from another UE) is a waste of resources (e.g., undesirably using processor time and/or undesirably using more battery power in unlicensed subchannel access in comparison to licensed subchannel access).

However, a direct application of the CBR type of access used in NR SL to NR-U may lead to starvation of an NR-U sidelink. For example, a subchannel can be sensed (e.g. as in C-V2X) as being busy due to interference received from a nearby WiFi node.

Various aspects of the disclosure may address the process of securing access and reducing wasted power by conveying sidelink communications in a distributed way over both licensed and unlicensed bands. For example, using concepts of carrier aggregation, a wireless communication device may make use of a primary carrier including one or more subchannels in a licensed band to handle control signaling and conduct access control (e.g., scheduling), while making use of a secondary carrier in an unlicensed band to handle traffic (e.g. user data). The access control may be performed in an efficient manner using NR SL licensed resources, while data can be offloaded onto subchannels in the unlicensed band using NR-U unlicensed resources. Use of a primary carrier in the licensed band for access control operations, to facilitate access (e.g., perform scheduling) to a secondary carrier in the unlicensed band, may result in less power consumption when compared to using the unlicensed band for all sidelink control and traffic communication. In addition, the carrier aggregation scheme described herein presents an added benefit in that an SL UE may need to only monitor the primary carrier (e.g., in the licensed band) for sidelink control information (SCI). More particularly, the SL UE may need to only monitor the primary carrier for SCI stage 1 (SCI-1) information. This eliminates a requirement or need for the SL UE to monitor the secondary carrier in the unlicensed band for SCI-1, for example.

Figure 5:
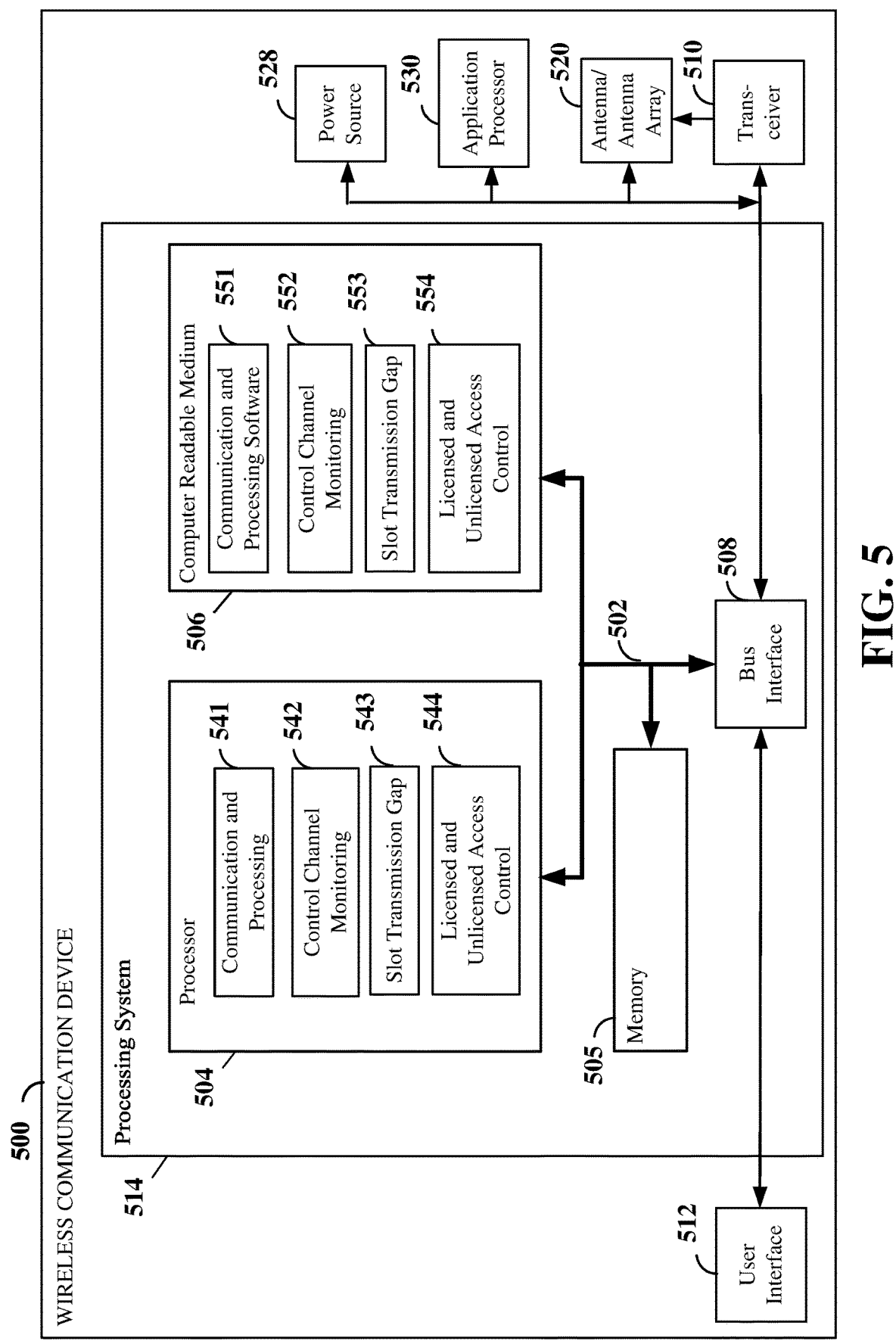
FIG. 5 is a block diagram conceptually illustrating an example of a hardware implementation of a wireless communication device employing a processing system according to some aspects.

FIG. 5 is a block diagram illustrating an example of a hardware implementation of a wireless communication device 500 employing a processing system 514 according to some aspects. The wireless communication device 500 may engage in sidelink (SL) communication. In accordance with various aspects of the disclosure, an element, or any portion of an element, or any combination of elements may be implemented with a processing system 514 that includes one or more processors, such as processor 504. The wireless communication device 500 may be a wireless communication device or user equipment (UE) as illustrated and described in any one or more of FIGS. 1, 2, and/or 3. The wireless communication device 500 may be referred to as the wireless communication device 500 or an SL UE, interchangeably.

The wireless communication device 500 may be implemented with a processing system 514 that includes one or more processors, such as processor 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 500 may be configured to perform any one or more of the functions described herein. That is, the processor 504, as utilized in a wireless communication device 500, may be used to implement any one or more of the methods or processes described below and illustrated, for example, in FIGS. 6-11.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further.

A bus interface 508 provides an interface between the bus 502 and a transceiver 510. The transceiver 510 provides a means for communicating with various other apparatus over a transmission medium (e.g., air interface). The transceiver 510 may further be coupled to one or more antennas/antenna array 520. The bus interface 508 further provides an interface between the bus 502 and a user interface 512 (e.g., keypad, display, touch screen, speaker, microphone, control features, etc.). Of course, such a user interface 512 is optional, and may be omitted in some examples. In addition, the bus interface 508 further provides an interface between the bus 502 and a power source 528, and between the bus 502 and an application processor 530, which may be separate from a modem (not shown) of the wireless communication device 500 or processing system 514.

One or more processors, such as processor 504, in the processing system 514 may be responsible for managing the bus 502 and general processing, including the execution of software stored on the computer-readable medium 506. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The software, when executed by the processor 504, causes the processing system 514 to perform the various processes and functions described herein for any particular apparatus. The computer-readable medium 506 and the memory 505 may also be used for storing data that is manipulated by the processor 504 when executing software.

The computer-readable medium 506 may be a non-transitory computer-readable medium and may be referred to as a computer-readable storage medium or a non-transitory computer-readable medium. The non-transitory computer-readable medium may store computer-executable code (e.g., processor-executable code). The computer executable code may include code for causing a computer (e.g., a processor) to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product or article of manufacture. By way of example, a computer program product or article of manufacture may include the computer-readable medium 506 in packaging materials. In some examples, the computer-readable medium 506 may be part of the memory 505. Those skilled in the art will recognize how best to implement the described functionality presented throughout this disclosure depending on the particular application and the overall design constraints imposed on the overall system.

In some aspects of the disclosure, the processor 504 may include communication and processing circuitry 541 configured for various functions, including for example communicating with a network core (e.g., a 5G core network), other scheduled entities, or any other entity, such as, for example, local infrastructure or an entity communicating with the wireless communication device 500 via the Internet, such as a network provider. In some examples, the communication and processing circuitry 541 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 541 may be configured to receive and process uplink traffic and uplink control messages (e.g., similar to uplink traffic 116 and uplink control 118 of FIG. 1), transmit and process downlink traffic and downlink control messages (e.g., similar to downlink traffic 112 and downlink control 114), and/or receive, transmit, and process sidelink traffic and control messages via the antennas/antenna array 520 and the transceiver 510. The communication and processing circuitry 541 may further be configured to execute communication and processing software 551 stored on the computer-readable medium 506 to implement one or more functions described herein.

In some aspects of the disclosure, the processor 504 may include control channel monitoring circuitry 542 configured for various functions, including, for example, monitoring control channels and decoding control messages conveyed over a primary carrier in a licensed band. In some examples, the control channel monitoring circuitry 542 may include one or more hardware components that provide the physical structure that performs processes related to monitoring control channels and decoding control messages over a primary carrier in a licensed band. Monitored channels may include PDCCH and PSCCH. A control messages may include a grant of an allocation of the licensed and/or unlicensed spectrum to the wireless communication device 500. Control messages may include sidelink control information (SCI) messages, including stage 1 SCI (SCI-1) messages and stage 2 SCI (SCI-2) messages. In addition, the control channel monitoring circuitry 542 may be configured to decode such messages using blind decoding (e.g., for SCI-1 messages) and/or decoding of one message using data obtained from another message (e.g., decoding an SCI 2 message with data obtained from an SCI-1 message). The control channel monitoring circuitry 542 may further be configured to execute control channel monitoring software 552 stored on the computer-readable medium 506 to implement one or more functions described herein.

In some aspects of the disclosure, the processor 504 may include slot transmission gap circuitry 543 configured for various functions, including, for example, transmitting sidelink control in a fist subchannel during a slot, or transmitting sidelink control in the first subchannel during the slot, except during a symbol gap that would be occupied with transmission of at least a last symbol of a plurality of symbols supported by the slot. In some examples, the slot transmission gap circuitry 543 may include one or more hardware components that provide the physical structure that performs processes related to transmitting sidelink control in the first subchannel during a slot, or transmitting sidelink control in the first subchannel during the slot, except during a symbol gap that would be occupied with transmission of at least a last symbol of a plurality of symbols supported by the slot. The slot transmission gap circuitry 543 may further be configured to execute slot transmission gap software 553 stored on the computer-readable medium 506 to implement one or more functions described herein.

In some aspects of the disclosure, the processor 504 may include licensed and unlicensed access control circuitry 544 configured for various functions, including, for example, seeking access to a subcarrier in an unlicensed band, or seeking access to a subcarrier in an unlicensed band during (or beginning during) a symbol gap in a transmission from a licensed channel. In some examples, the licensed and unlicensed access control circuitry 544 may include one or more hardware components that provide the physical structure that performs processes related to seeking access to a subcarrier in the unlicensed band, or seeking access to the subcarrier in an unlicensed band during (or beginning during) a symbol gap in a transmission from the licensed channel. The licensed and unlicensed access control circuitry 544 may also be configured to derive frame-based equipment (FBE) frame timing over an unlicensed band from timing in a licensed band and/or synchronize first channel access to a subcarrier in an unlicensed band to second channel access to a subcarrier in a licensed band. The licensed and unlicensed access control circuitry 544 may further be configured to execute licensed and unlicensed access control software 554 stored on the computer-readable medium 506 to implement one or more functions described herein.

In one configuration, the apparatus 500 for wireless communication includes means for occupying a slot in a first subchannel, where the first subchannel comprises a sidelink subchannel in a licensed band, means for transmitting sidelink control in the first subchannel during the slot, except during a symbol gap indicated to include at least a last symbol of a plurality of symbols supported by the slot, means for seeking access to a secondary carrier in an unlicensed band during the symbol gap, and means for transmitting sidelink traffic in the secondary carrier upon receiving access to the secondary carrier. In one aspect, the means for transmitting sidelink traffic in the secondary carrier upon receiving access to the secondary carrier transmits the sidelink traffic during or following the symbol gap. In one aspect, the aforementioned means may be the processor(s) 504 shown in FIG. 5 configured to perform the functions recited by the aforementioned means. In another aspect, the aforementioned means may be a circuit, or any apparatus configured to perform the functions recited by the aforementioned means.

Of course, in the above examples, the circuitry included in the processor 504 is merely provided as an example, and other means for carrying out the described functions may be included within various aspects of the present disclosure, including but not limited to the instructions stored in the computer-readable medium 506, or any other suitable apparatus or means described in any one of the FIGS. 1, 2, 3 and/or 5, and utilizing, for example, the methods, processes and/or algorithms described herein in relation to FIGS. 6-11.

NR SL may provide a channel busy ratio (CBR) and/or channel occupancy ratio (CR) based QoS management mechanism. While channel congestion control and QoS management based on CBR and/or CR may be well defined for sidelink in the licensed spectrum (e.g., NR SL), it may not be well defined, and may be difficult to perform, for unlicensed spectrum sidelink (e.g., NR-U).

For example, in Mode 2, used for licensed spectrum sidelink (NR SL), there may be a mechanism to control how many UEs are competing for channel access. However, the same mechanism may not exist for the unlicensed spectrum. Therefore, various aspects of the disclosure seek to regulate channel access and QoS of a secondary carrier in the unlicensed band by using measurements and measurement results based on channel access and QoS of a primary carrier in the licensed band (e.g., NR SL). The measurements and timing of the primary carrier (or subchannels thereof) in the licensed band may be applied to the secondary carrier in the unlicensed band. Because measurements and timing of the primary carrier are applicable to the secondary carrier, it may be sufficient to work with the primary carrier exclusively when determining channel access timing for both the primary and secondary carriers.

According to one aspect, a sidelink communication may anchor on a primary carrier in a licensed band for radio resource management (RRM) and quality of service (QoS) control for the secondary carrier in the unlicensed band. Frame-based equipment (FBE) channel access may be used for its relatively lower overhead and ease of implementation at the UE side.

With the various aspects of the disclosure described herein, a minimal (e.g., light) design for the unlicensed SL carrier may be realized (e.g., the unlicensed SL carrier may need no Master Information Block (MIB), System Information Block (SIB), or even Synchronization Signal Block (SSB)) as control may be carried on the SL licensed carrier with traffic being carried on the unlicensed carrier. According to some aspects, all control may be carried on the SL licensed carrier and all traffic may be carried on the unlicensed SL carrier. Additionally, using aspects described herein, coordination of reservations across nodes or links (e.g., for both the licensed carrier and the unlicensed carrier) can be reliably handled on the licensed carrier, in a way that is similar to how reservations work on the PC5 interface.

Figure 6:
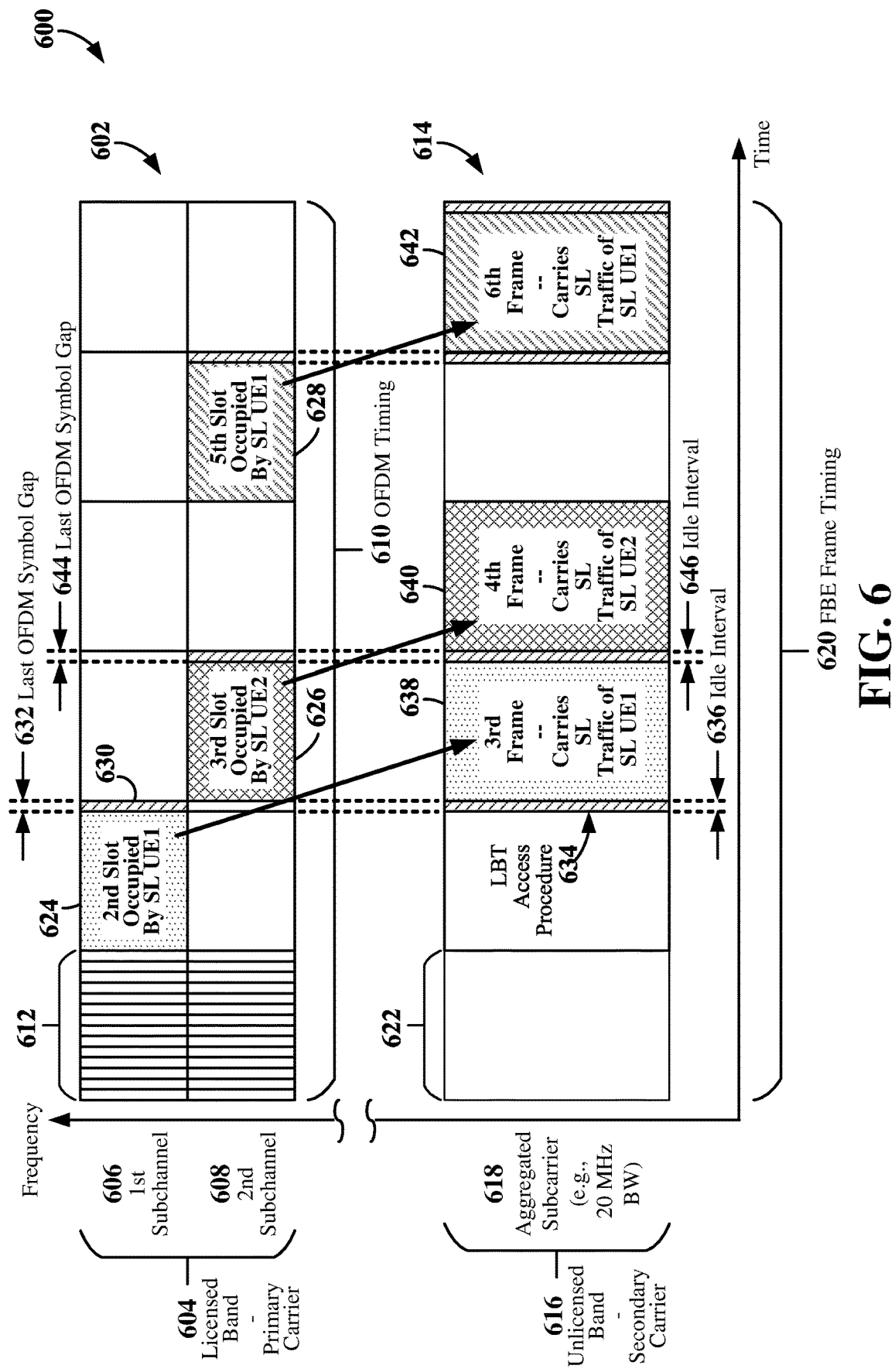
FIG. 6 is an illustration of two sets of time-frequency resources according to aspects herein.

FIG. 6 is an illustration of two sets of time-frequency resources 600 according to some aspects herein. A first set 602 of time-frequency resources occupies a licensed band 604 of subchannels (e.g., ITS band of around 5.8-5.9 GHz). The licensed band 604 of subchannels includes a first subchannel 606 and a second subchannel 608. The timing in the first set 602 of time-frequency resources may be based on resource blocks that have a width of one OFDM symbol. Accordingly, based on OFDM timing 610, the time domain in the licensed band 604 of subchannels is divided into a plurality of slots. As depicted in the exemplary illustration of the first slot 612, each slot may be divided into 14 OFDM symbols. Access control or scheduling in the licensed band 604 may be determined by a first standard for communication (including, for example, sidelink communication). One example of the first standard may be NR SL. Other standards, timing configurations, frequency bands and/or slot configurations may also be utilized with various aspects of the disclosure.

A second set 614 of time-frequency resources occupies an unlicensed band 616 of subchannels (e.g., around 5.6-5.7 GHz). The unlicensed band 616 of subchannels includes an aggregated subcarrier 618. According to some aspects, the aggregated subcarrier may have a 20 MHz bandwidth and may be located in the 5 GHz unlicensed band. Timing in the unlicensed band 616 may be based on FBE frame timing 620. An exemplary first frame 622 is depicted. Access control or scheduling in the unlicensed band 616 may be determined by a second standard for communication (including, for example, sidelink communication). One example of the second standard may be NR-U. Other standards, timing configurations, and/or frequency bands may be used with various aspects of the disclosure.

A first wireless communication device (not shown) (referred to herein as SL UE1) conducting sidelink communication and a second wireless communication device (not shown) (referred to herein as SL UE2) conducting sidelink communication may each monitor, for example, a physical sidelink control channel (PSCCH) to identify and decode a sidelink control information (SCI) message. More particularly, SL UE1 and SL UE2 may each monitor, for example, the PSCCH to identify and perform blind decoding of a stage 1 sidelink control information (SCI-1) message. An SCI-1 message may include a grant for time-frequency resources for sidelink communications. For example, one or more SCI-1 messages may have allocated the second slot 624 in the first subchannel 606 and the fifth slot 628 in the second subchannel 608 to SL UE1 for sidelink communication. The same or another SCI-1 message may have allocated the third slot 626 in the second subchannel 608 to SL UE2 for sidelink communication. Accordingly, the second slot 624 in the first subchannel 606 and the fifth slot 628 second subchannel 608 may each be occupied by SL UE1, while the third slot 626 in the second subchannel 608 may be occupied by SL UE2

Each of SL UE1 and SL UE2 may conduct sidelink communication by exchanging sidelink traffic (e.g., user data) messages and sidelink control messages. Each of SL UE1 and SL UE2 may make a determination to employ carrier aggregation as a way of organizing, transmitting, and receiving sidelink communications. Accordingly, each of SL UE1 and SL UE2 may designate a primary carrier and at least one secondary carrier. The primary carrier may carry sidelink control while the secondary carrier may carry sidelink traffic. The first subchannel 606 and the second subchannel 608 may be pre-designated as sidelink subchannels (sometimes referred to herein as carrier aggregation subchannels (CA subchannels).

Furthermore, each of SL UE1 and SL UE2 may offload (e.g., after making a determination to offload) the sidelink traffic from the subchannels (e.g., CA subchannels) in the licensed band 604 (e.g., ITS band of about 5.8-5.9 GHZ) to subchannels in the unlicensed band 616 (e.g., about 5.6 GHz to 5.7 GHz). The subchannels in the unlicensed band may be referred to herein as non-CA subchannels. In other words, each of SL UE1 and SL UE2 may aggregate (e.g., after making a determination to aggregate) a respective carrier in the unlicensed band to act as the secondary carrier and to carry, for example, the sidelink traffic in the unlicensed band 616.

As mentioned above, access control for sidelink communication in the licensed band 604, via NR SL for example, is more efficient than access control for sidelink communication in the unlicensed band 616, via NR-U using FBE-based access control for example. By way of example, the timing associated with when a wireless communication device may occupy a channel is dynamic in NR-U FBE-based access control. In particular, a first wireless communication device may gain access to the channel by, for example, successfully completing an FBE LBT channel access procedure, that may result in a second wireless communication device being unable to use the channel for some unknown amount of time.

Aspects described herein may overcome at least the deficiencies of FBE-based access control for sidelink communication in the unlicensed band 616 that are exemplified herein. Aspects described herein may provide for an efficient offloading of sidelink traffic from the primary carrier in the licensed band 604 to the secondary carrier in the unlicensed band. Furthermore, aspects described herein may produce a reduction in cross-carrier interference during an FBE LBT access procedure in the unlicensed band 616. Aspects described herein may also allow a wireless communication device (e.g., SL UE1, SL UE2) to derive frame-based equipment (FBE) frame timing 620 in the unlicensed band 616 from timing (e.g., OFDM timing 610) in the licensed band 604. In other words, the wireless communication device may derive frame-based equipment (FBE) frame timing over the unlicensed band from timing in the licensed band. Still further, aspects described herein may allow a wireless communication device to synchronize first channel access to a secondary carrier (e.g., an aggregated subcarrier 618) in the unlicensed band 616, based on second channel access to a first subchannel 606 and/or second subchannel 608 in the licensed band 604.

As depicted in FIG. 6, after a wireless communication device (e.g., SL UE1, SL UE2) occupies a SL subchannel (e.g., a CA subchannel) in a given slot, the wireless communication device may derive the FBE frame timing 620 for the secondary carrier (e.g., aggregated subcarrier 618 in unlicensed band 616) from the OFDM timing 610 for the primary carrier (e.g., one or both of the first subchannel 606 and the second subchannel 608 in the licensed band 604). The wireless communication device may occupy the SL subchannel with an enabling link. In other words, the wireless communication device may synchronize first channel access to the aggregated subcarrier 618 of the secondary carrier in the unlicensed band 616, based on second channel access to the first subcarrier (e.g., first subchannel 606 and/or second subchannel 608) in the licensed band 604.

According to some aspects, using SL UE1 as an example, SL UE1 may occupy the second slot 624 of the first subchannel 606 (e.g., a first SL subchannel, a first CA subchannel) in the primary carrier in the licensed band 604. SL UE1 may omit a transmission during at least the last OFDM symbol position 630 of the second slot 624. In general, the duration of the omitted transmission may be referred to as a symbol gap. For exemplary and noon-limiting purposes, an example in which a transmission is omitted from the last OFDM symbol in a slot is described. The duration of the last OFDM symbol position 630 may be referred to herein as the last OFDM symbol gap 632.

Last OFDM symbol positions that have no transmissions (e.g., last OFDM symbol position 630) and idle intervals (e.g., idle interval 636), which are time intervals in the unlicensed band 616 that overlap with at least a portion of the last OFDM symbol gap (e.g., 632) are both indicated by left-to-right downward sloping hash marks in FIG. 6. An idle interval (e.g., 636) may begin coincident with the start of the last OFDM symbol positions (e.g., last OFDM symbol position 630) or anywhere within the last OFDM symbol gap (e.g., 632). The last OFDM symbol gap (e.g., last OFDM symbol gap 632) and the idle interval (e.g., idle interval 636) do not necessarily have the same duration. The relationships between the various features of FIG. 6 is illustrative and non-limiting.

SL UE1 may conduct an FBE listen before talk access procedure (LBT procedure 634) to gain access to the aggregated subcarrier 618 in the unlicensed band 616 (e.g., the secondary carrier) by beginning the LBT process 634 at the start of, or anywhere within, the idle interval 636. The idle interval at least partially overlaps with the last OFDM symbol gap 632 of the portion of the second slot 624 occupied by SL UE1. In other words, a wireless communication device may begin to seek access to a secondary carrier in an unlicensed band beginning at the start of the idle interval 636 or during any portion of the idle interval 636 that at least partially overlaps with the last OFDM symbol gap. Upon successful completion of the LBT process 634 (e.g., upon receiving access to the aggregated subcarrier 618, that is, the secondary carrier), SL UE1 may offload the sidelink traffic to the third frame 638 of the secondary carrier (e.g., the third frame of the aggregated subcarrier 618 in the unlicensed band 616).

Beginning the LBT procedure 634 at the start of, or anywhere within, the idle interval 636 helps to ensure that a transmission on a primary carrier in the licensed band 604 (e.g., in the ITS band of about 5.8-5.9 GHz) will not interfere with the LBT access procedure 634 that begins during the idle interval 636. This result may be achieved when, for example, when SL UE1 omits transmission of the last OFDM symbol 630 from the slot 624, as exemplified in FIG. 6. The unlicensed band 616 may be, for example, at around 5.6-5.7 GHz. During FBE LBT, the wireless communication device measures the energy in the channel it is seeking to access. Therefore, if there are no transmissions in the primary carrier in the licensed band 604 (which as recognized from the examples above may be close in frequency to the frequency of the aggregated subcarrier 618 (e.g., the second carrier) in the unlicensed band 616) during the FBE LBT access procedure 634, it is less likely that the energy from a primary carrier in a licensed band 604 transmission will spill over into the channel being sensed for access in the secondary carrier.

Similarly, using SL UE2 as an example, SL UE2 may conduct an FBE LBT access procedure to gain access to the aggregated subcarrier 618 in the unlicensed band 616 (e.g., the secondary carrier) by beginning the LBT access procedure at the start of, or anywhere within, the idle interval 646. The idle interval 646 at least partially overlaps with the last OFDM symbol gap 644 of the portion of the third slot 626 occupied by SL UE2. Upon successful completion of the LBT access procedure, SL UE2 may offload the sidelink traffic to the fourth frame 640 of the secondary carrier (e.g., the aggregated subcarrier 618 of the unlicensed band 616).

Returning to using SL UE1 as an example, SL UE1 may conduct an FBE LBT access procedure to gain access to the aggregated subcarrier 618 in the unlicensed band 616 (e.g., the secondary carrier) by beginning the LBT process at the start of, or anywhere within, the respective idle interval. The respective idle interval at least partially overlaps with the respective last OFDM symbol gap of the portion of the fifth slot 628 occupied by SL UE1. Upon successful completion of the LBT access procedure, SL UE1 may offload the sidelink traffic to the sixth frame 642 of the secondary carrier (e.g., the aggregated subcarrier 618 of the unlicensed band 616).

Figure 7:
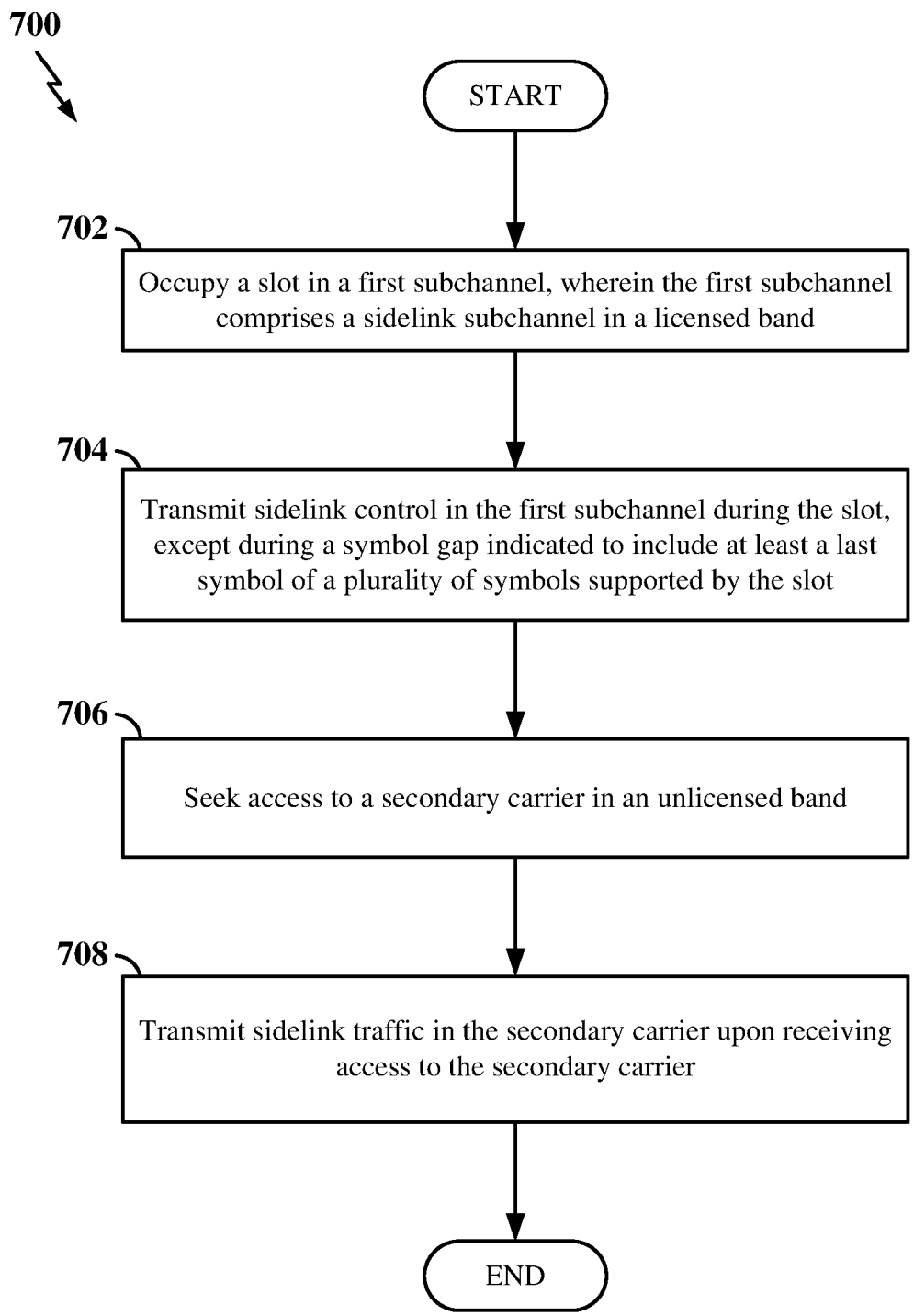
FIG. 7 is a flow chart illustrating an exemplary process for use of carrier aggregation over licensed and unlicensed spectrum to perform SL communication between wireless communication devices in a wireless communication network in accordance with some aspects of the present disclosure.

FIG. 7 is a flow chart illustrating an exemplary process 700 for use of carrier aggregation over licensed and unlicensed spectrum to perform SL communication between wireless communication devices (e.g., SL UEs) in a wireless communication network in accordance with some aspects of the present disclosure. As described below, some or all illustrated features may be omitted in a particular implementation within the scope of the present disclosure, and some illustrated features may not be required for implementation of all embodiments. In some examples, the process 700 (e.g., a method) may be carried out by the wireless communication device illustrated in FIG. 5. In some examples, the process 700 may be carried out by any suitable apparatus or means for carrying out the functions or algorithm described below.

At block 702, the wireless communication device may occupy a slot in a first subchannel, where the first subchannel comprises a sidelink subchannel in a licensed band. The wireless communication device may occupy the slot in the first subchannel after successful completion of an access procedure, for example.

At block 704 the wireless communication device may transmit sidelink control in the first subchannel during the slot, except during a symbol gap indicated to include at least a last symbol of a plurality of symbols supported by the slot.

At block 706, the wireless communication device may seek access to a secondary carrier in an unlicensed band. According to some aspects, the wireless device may seek access to the secondary carrier beginning and/or during the symbol gap. The period during which the wireless communication device seeks access may be referred to as an idle interval. The idle interval may at least partially overlap with the symbol gap. According to some aspects, seeking access to the secondary carrier in the unlicensed band may include deriving frame-based equipment (FBE) frame timing over the unlicensed band from timing in the licensed band (e.g., OFDM timing). According to one aspect, seeking access to the secondary carrier in the unlicensed band may include synchronizing first channel access to the secondary carrier in the unlicensed band, based on second channel access to the first subchannel in the licensed band. According to another aspect, seeking access to the secondary carrier in the unlicensed band may include using a frame-based equipment (FBE) listen before talk (LBT) procedure to seek the access to the secondary carrier during an idle interval that at least partially overlaps with the symbol gap. According to another aspect, seeking access to the secondary carrier in the unlicensed band may include seeking the access to the secondary carrier in the unlicensed band during the symbol gap. According to some examples, the method may also include identifying a primary carrier that includes the first subchannel and monitoring only the primary carrier for sidelink control.

At block 708, the wireless communication device may transmit sidelink traffic in the secondary carrier upon receiving (or obtaining) the access to the secondary carrier. According to one aspect, the wireless communication device may transmit sidelink traffic in the secondary carrier upon receiving (or obtaining) the access to the secondary carrier during or following the symbol gap.

According to other aspects, the wireless communication device may aggregate (e.g., after making a determination to aggregate) the sidelink control and the sidelink traffic to a primary carrier and the secondary carrier, respectively, and may further designate the licensed band to include the primary carrier and designate the unlicensed band to include the secondary carrier.

According to still other aspects, the wireless communication device may carry stage 1 sidelink control information over the first subchannel and carry enhanced stage 2 sidelink control information including at least one of modulation and coding scheme (MCD), hybrid automatic repeat request (HARQ), or transmission (TX) parameters for the secondary carrier over the first subchannel.

Figures 8A, 8B:
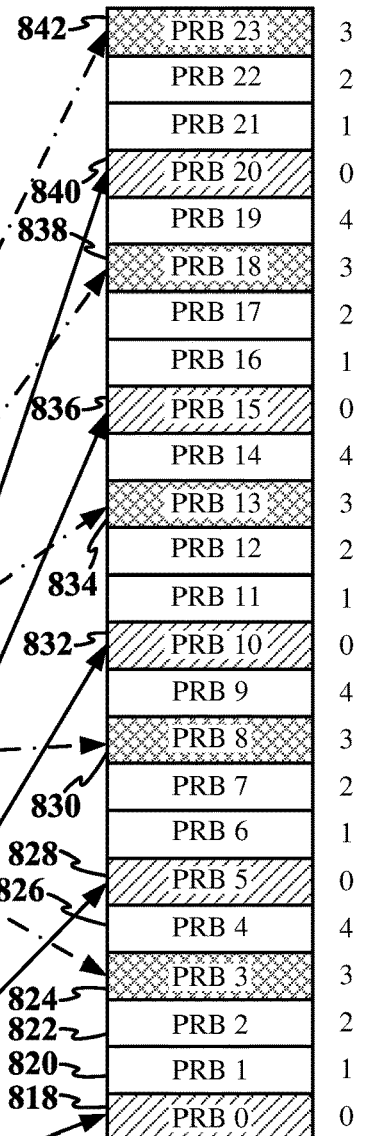
FIG. 8A is an example of a plurality of plurality subchannels in a licensed band according to some aspects.
FIG. 8B is an example of a plurality of resource blocks IN AN unlicensed band according to some aspects.

FIG. 8A is an example of a plurality subchannels 802 in a licensed band according to some aspects. FIG. 8B is an example of a plurality of resource blocks 804 (e.g., physical resource blocks) in an unlicensed band according to some aspects. FIG. 8A and FIG. 8B together constitute FIG. 8.

Each of the plurality of subchannels 802 of FIG. 8A may correspond a respective number of resource blocks in the frequency domain. Although the plurality of subchannels 802 of FIG. 8A are all depicted as having the same frequency span (vertical span), the presentation is made for convenience and the frequency spans (and numbers of resource blocks) of the various subchannels may be different and/or the same as one another.

The lowest frequency on the frequency axis in FIG. 8 is identified as "Point A." According to some aspects, Point A may represent a center frequency of a lowest subcarrier in the frequency domain. Point A may be used as common reference point for various subchannels and/or resource blocks. For example, the lowest subchannel (subchannel 0 806) of FIG. 8A is spaced apart from Point A by a first predetermined value. The lowest physical resource block (PRB 0 818) of FIG. 8B is spaced apart from Point A by a second predetermined value. The first predetermined value and the second predetermined value may be greater than, equal to, or lesser than the other.

The duration (in the time domain) of the column of the plurality of subchannels 802 and the column of the plurality of physical resource blocks 804 may be the same or different. By way of example, either or both of the durations may be a slot (e.g., first slot 612, second slot 624, third slot 626, or fifth slot 628 of FIG. 6), or may be any duration, such as, for example, a subframe, a frame, or any other duration without limitation.

Wireless communication devices, for example, wireless communication device 500, SL UE1, and/or SL UE2 may each perform an access procedure to gain access to and to occupy any of the plurality of subchannels 802 and may be referred to as CA subchannels, an SL subchannels, or a subchannel. By way of example and without limitation, SL UE1 may occupy subchannel 0 806, SL UE2 may occupy subchannel 1 808, SL UE3 may occupy subchannel 2 810, SL UE4 may occupy subchannel 3 812, SL UE5 may occupy subchannel 4 814, and SL UE6 may occupy subchannel 5 816. Additional subchannels may be occupied by additional respective SL UEs, as shown; however, in FIG. 8A, the additional subchannels are not provided with reference numbers to avoid cluttering the drawing. The occupation of subchannels need not be sequential, nor must all subchannels be occupied. The appearance and configuration of the plurality of subchannels 802 in FIG. 8A is exemplary and non-limiting.

The plurality of physical resource blocks 804 of FIG. 8B are each identified by a physical resource block number and an interlace index. In the example of FIG. 8B, 24 PRBs (PRB 0 818-PRB 23 840) are depicted. The number of PRBs is illustrative and not limiting. Not all PRBs are provided with reference numbers to avoid clutter the drawing. In the example of FIG. 8B, there are five interlaces (interlace index numbers 0-4). The quantity of five interlaces may correspond to a 30 kHz subcarrier spacing (SCS). Other numbers of interlaces and SCSs are within the scope of the disclosure. In the example of FIG. 8B, the interlaces begin at PRB 0 818 with interlace index 0 and repeat every five interlaces, such that each succeeding interlace 4 is adjacent to a next succeeding interlace 0.

In general, FIG. 8 depicts interlaced channel access over the secondary carrier 805. In FIG. 8, Frequency Division Multiplexing (FDM) is used in both the primary carrier 803 and the secondary carrier 805. FDM (e.g., an interlaced waveform) may be used so that the unlicensed secondary carrier 805 may be shared by multiple wireless communication devices (e.g., SL UEs) that have occupied multiple CA subchannels (also referred to as subchannels and SL subchannels) in the primary carrier 803. The interlaced waveform, (e.g., the interlaced waveform of the secondary carrier 805 of FIG. 8B) may be used for the unlicensed band of the secondary carrier 805 to meet occupied channel bandwidth (OCB) and/or power spectral density (PSD) regulations (such as various Governmental regulations imposed worldwide) by spreading the channel among a plurality of interlaced physical resource blocks in the secondary carrier 805 in the unlicensed band. Although both the primary carrier 803 and the secondary carrier 805 use FDM, the ways that the FDM is implemented are different between the primary carrier 803 and the secondary carrier 805 as depicted by a comparison of FIG. 8A and the interlaced waveform of FIG. 8B.

A SL UE that occupies a given subchannel in the primary carrier 803 of FIG. 8A may determine which interlace to use in a number of ways including, for example, by having a preconfigured set of subchannel and interlace combinations. In other words, a network operator for a given region or city, for example, may specify certain subchannel and interlace combinations, or specify interlace distributions according to some other way. The subchannel and interlace combinations may be preconfigured, for example, preloaded into wireless communication devices of the network operator or pushed down to or pulled down by the wireless communication devices from, for example, a server accessible to the wireless communication device via the Internet.

In the example of FIG. 8, SL UE1 has occupied subchannel 0 806 after completing an access procedure. In the example, subchannel 0 806 is associated with interlace 0 (interlace index 0), although it could be associated with any of interlaces 0-4. Through the association with interlace 0, SL UE1 is able to utilize subchannel 0 806 in the primary carrier 803 licensed band and also aggregate PRB 0 818, PRB 5 828, PRB 10 832, PRB 15 836, and PRB 20 840 in the secondary carrier 805 of the unlicensed band. The set of PRB 0 818, PRB 5 828, PRB 10 832, PRB 15 836, and PRB 20 840 is identified as each of these PRBs is associated with interlace index 0. The example includes PRB 0 818 through PRB 23 842 with 5 interlaces; however, this span and index combination is exemplary and non-limiting. For example, the span may include a span of 20 MHz, which may include more than the 24 physical resource blocks depicted in the example.

Also, in the example of FIG. 8, SL UE6 has occupied subchannel 5 816 after completing an access procedure. In the example, subchannel 5 816 is associated with interlace 3 (interlace index 3), although it could be associated with any of interlaces 0-4. Through the association with interlace 3, SL UE6 is able to utilize subchannel 5 816 in the primary carrier 803 licensed band and also aggregate PRB 3 824, PRB 8 830, PRB 13 834, PRB 18 838, and PRB 23 842 in the secondary carrier 805 of the unlicensed band. The set of PRB 3 824, PRB 8 830, PRB 13 834, PRB 18 838, and PRB 23 842 is identified as each of these PRBs is associated with interlace index 3. Like the previous example, the span of 24 PRBs, from PRB 0 818 to PRB 23 842 is exemplary and non-limiting. This number of PRBs or a different number of PRBs may correspond to a span of 20 MHz, which may include more than the 24 physical resource blocks depicted in the example.

In the primary carrier 803 licensed band, subchannel 1 808 may be occupied by SL UE2, subchannel 2 810 may be occupied by SL UE3, subchannel 3 812 may be occupied by subchannel SL UE4, and subchannel 4 814 may be occupied by SL UE5. In this example, none of these subchannels is associated with any interlace, therefore they may not interlace channel access over the secondary carrier 805 in the unlicensed band.

In the examples of subchannel 0 806 and subchannel 5 816, corresponding to interlace index 0 and interlace index 3, respectively, a number of FDM channels over the secondary carrier (m_s=5) which is smaller than the number of FDM channels over the primary carrier (m_p>12). Therefore, consistent with the example, and according to some aspects, m_s≤m_p when it comes to mapping FDM subchannels in the primary carrier 803 to interlaced FDM channels in the secondary carrier 805. Therefore, every subchannel in the primary carrier 803 in the licensed band may not have a counterpart in the secondary carrier 805 in the unlicensed band. However, through use of interlacing, a wireless communication device may share a portion of the unlicensed spectrum among a plurality of subchannels in the primary carrier 803 in the licensed spectrum.

The aspect of interlaced channel access over the secondary carrier 805 may be useful in several scenarios including, for example, when the primary carrier 803 may be used for low-latency safety-like small packet yet the secondary carrier 805 may be for large packet with relaxed latency. According to such aspects, the secondary carrier 805 in the unlicensed band can be shared by multiple SL UEs that have occupied multiple respective subchannels (CA subchannels, SL subchannels) in the primary carrier 803 licensed band. According to another example, a high-priority SL UE can occupy multiple subchannels (CA subchannels, SL subchannels) in the primary carrier 803 and hence yielding multiple dimensions in the secondary carrier 805 unlicensed band. Therefore, similar to the first example given above, a wireless communication device (e.g., SL UE1) may map a first subchannel (e.g., subchannel 0 806) in a primary carrier 803 to a plurality of interlaced resource blocks (e.g., PRB 0 818, PRB 5 828, PRB 10 832, PRB 15 836, and PRB 20 840) in the secondary carrier 805 of the unlicensed band. Similar to the second example given above, a wireless communication device (e.g., SL UE5) may map a first subchannel (e.g., subchannel 5 816) in a primary carrier 803 to a plurality of interlaced resource blocks (e.g., PRB 3 824, PRB 8 830, PRB 13 834, PRB 18 838, and PRB 23 842) in the secondary carrier 805 of the unlicensed band.

In some examples, the wireless communication device may have one transmission block remaining and can obtain another transmission block upon receiving the access to the secondary carrier. In such examples, a method disclosed herein may include having the wireless communication device transmit the sidelink control and the sidelink traffic in the first subchannel. In some of these examples, the sidelink control may include an enhanced stage 2 sidelink control information (eSCI-2) message that defines at least one of a modulation and coding scheme (MCS) of the secondary carrier, hybrid automatic repeat request (HARQ) feedback of the secondary carrier, or a transmission (TX) parameter for the secondary carrier. In some of these examples, the sidelink control may include a first stage 2 sidelink control information (first SCI-2) message and a pointer to a second stage 2 SCI (second SCI-2) message carried over the secondary carrier.

According to some aspects, a wireless communication device exemplified herein may transmit only sidelink control in the first subchannel. The sidelink control may include, for example SCI or SCI plus slot format indication (SFI). According to some aspects, the sidelink control may include a first stage 1 sidelink control information (first SCI-1) message and a pointer to a second stage 2 SCI (second SCI-2) message carried over the secondary carrier. According to other aspects, the sidelink control may include a stage one sidelink control information (SCI-1) message and an enhanced stage 2 sidelink control information (eSCI-2) message that defines at least one of a modulation and coding scheme (MCS) for the secondary carrier, hybrid automatic repeat request (HARQ) feedback for the secondary carrier, or a transmission (TX) parameter for the secondary carrier.

Figure 9:
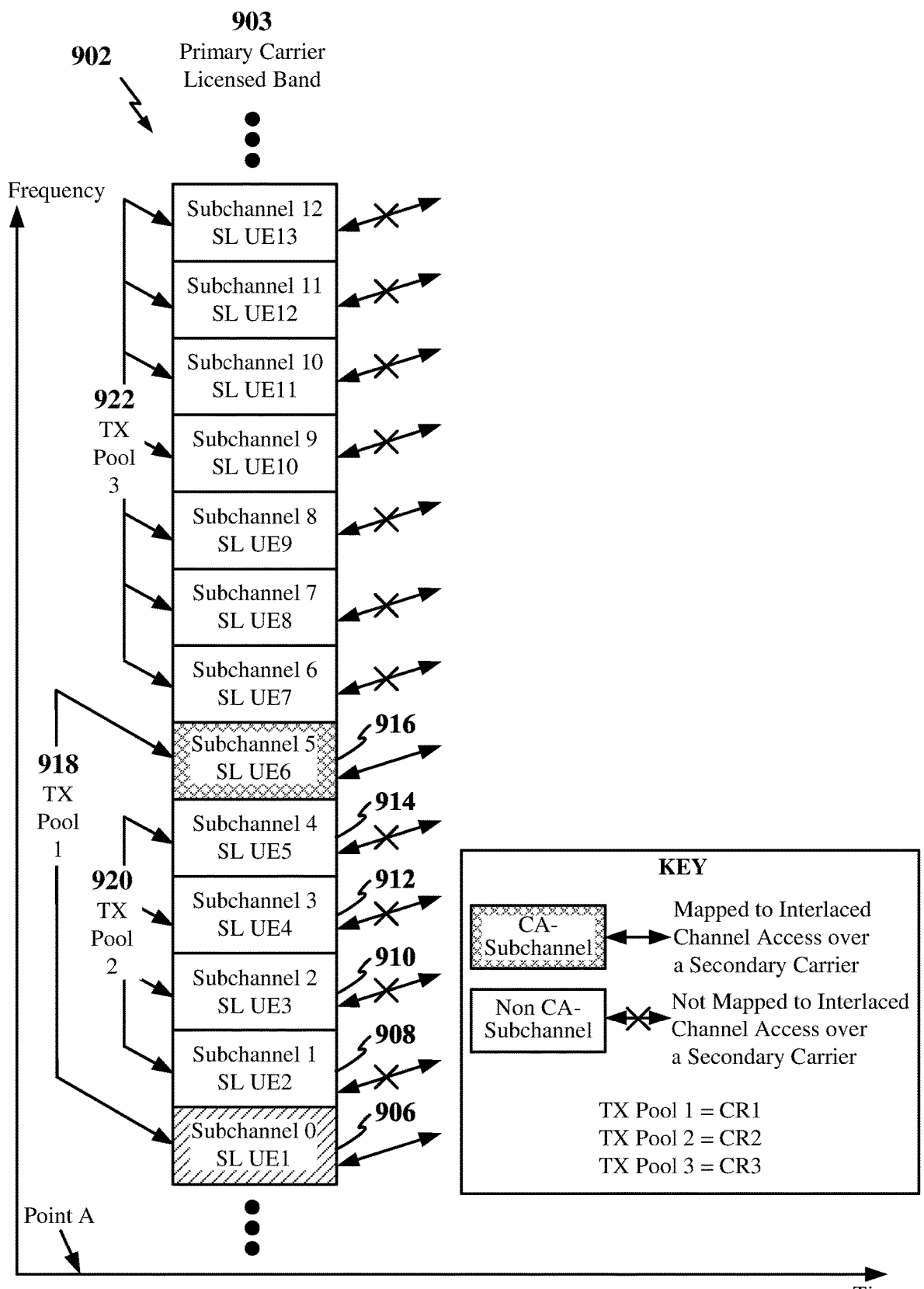
FIG. 9 is an example of a plurality subchannels in a licensed band according to some aspects.

FIG. 9 is an example of a plurality subchannels 902 in a licensed band according to some aspects. Each of the plurality of subchannels 902 may correspond a respective number of resource blocks in the frequency domain. Although the plurality of subchannels 902 of FIG. 9 are all depicted as having the same frequency span (vertical span), the presentation is made for convenience and the frequency spans (and numbers of resource blocks) of the various subchannels may be different and/or the same as one another.

The lowest frequency on the frequency axis in FIG. 9 is identified as "Point A." According to some aspects, Point A may represent a center frequency of a lowest subcarrier in the frequency domain. Point A may be used as common reference point for various subchannels and/or resource blocks. For example, the lowest subchannel (subchannel 0 906) of FIG. 9 is spaced apart from Point A by a first predetermined value.

A plurality of wireless communication devices (e.g., SL UE1-SL UE13) (similar to wireless communication device 500 of FIG. 5) may each perform an access procedure to gain access to and to occupy any of the plurality of subchannels 902. By way of example and without limitation, SL UE1 may occupy subchannel 0 906, SL UE2 may occupy subchannel 1 908, SL UE3 may occupy subchannel 2 910, SL UE4 may occupy subchannel 3 912, SL UE5 may occupy subchannel 4 914, and SL UE6 may occupy subchannel 5 916. Additional subchannels may be occupied by additional respective SL UEs (e.g., SL UE7-SL UE13), as shown; however, in FIG. 9, the additional subchannels are not provided with reference numbers to avoid cluttering the drawing. The occupation of subchannels need not be sequential, nor must all subchannels be occupied. The appearance and configuration of the plurality of subchannels 902 in FIG. 9 is exemplary and non-limiting.

In the example of FIG. 9, two subchannels, subchannel 0 906 and subchannel 5 916 are mapped to interlaced channel access of a secondary carrier. The mapping of like-numbered subchannels occupied by like-numbered SL UEs was described in connection with FIG. 8 and will not be repeated here to avoid duplication. Subchannel 0 906 and subchannel 5 916 may be referred to as CA subchannels because, for example, they map to a carrier aggregated secondary channel (not shown, but similar to secondary carrier 805 of FIG. 8). On the other hand, subchannel 1 908, subchannel 2 910, subchannel 3 912, subchannel 4 914, and subchannels 6-12 (not provided with reference numbers to avoid cluttering the drawing) are not mapped to interlaced channel access over the secondary carrier.

To avoid hot competition for the CA subchannels in autonomous SL (e.g., Mode 2) or in LTE SL (e.g., Mode 4), a network entity or system may define respective carrier occupation ratios (CRs) under a congestion control network for CA subchannels and non-CA subchannels. Accordingly, for example, CA subchannels subchannel 0 906 and subchannel 5 916 may be defined for a first CR (e.g., CR1) while the remaining non-CA subchannels 1-4 and 6-12 may be defined for a different CR. However, as shown in FIG. 9, the granularity of the CRs may be further resolved by grouping the subchannels into transmission pools (TX Pools) and defining CR values, for example, according to the respective TX Pool. By way of example and without limitation, subchannel 0 906 and subchannel 5 916 may be members of a first TX Pool 918 (TX Pool 1), subchannel 1 908, subchannel 2 910, subchannel 3 912, and subchannel 4 914 may be members of a second TX Pool 920 (TX Pool 2), and subchannels 6-12 may be members of a third TX Pool 922 (TX Pool 3). The first TX Pool 918 may have a first CR (CR1), the second TX Pool 920 may have a second CR (CR2), and the third TX Pool 922 may have a third CR (CR3). When all subchannels are homogenous and there is one TX Pool, then there may be one CR. However, identifying some channels as CA subchannels and others as non-CA subchannels, the subchannels may be considered non-homogenous (or heterogenous) channels. Use of heterogeneous channels provides an ability to define two or more different CR values (e.g., CR levels). The different CR values may help to prevent all Mode 2 (or all Mode 4) wireless communication devices from competing for the CA subchannels. If only two CR levels are used, then, in the example of FIG. 9, CR2 may be set equal to CR3. In accordance with aspects described herein, the various CR values may be preconfigured (e.g., in the same way, for example, as described in connection with pre-configurations of interlaces (e.g., numbers of interlaces and values of interlace index numbers).

According to some aspects, a wireless communication device may use a first subchannel as an anchor in a primary carrier for interlaced channel access over a secondary carrier. In other words, the first subchannel may be, for example, a CA subchannel such as subchannel 0 906 and/or subchannel 5 916 of FIG. 9. The wireless communication device may obtain a first channel occupancy ratio (CR) that is associated with a first packet transmitted (or to be transmitted) over the first subchannel. For example, the first CR may be similar to CR1 of TX Pool 918 of FIG. 9. The first CR may be preconfigured; according to such an example, the first CR may be obtained from a memory of the wireless communication device, for example. The wireless communication device may identify a second subchannel that is not an anchor in the primary carrier for interlaced channel access over the secondary carrier. For example, the second subchannel may be any of non-CA subchannel 1 908, non-CA subchannel 2 910, non-CA subchannel 3 912, non-CA subchannel 14 914, and/or any of non-CA subchannels 6-12 of FIG. 9. The wireless communication device may obtain a second CR, different from the first CR, which is associated with a second packet transmitted in the second subchannel. For example, the second CR may be similar to CR2 of TX Pool 2 920 or CR3 of TX Pool 922 of FIG. 9. The wireless communication device may thereafter avoid competition for access to the first subchannel based on a difference between the first CR and the second CR.

According to some aspects, the CA subchannel may include only sidelink control, while according to other aspects the CA subchannel may include sidelink control and sidelink traffic.

According to some aspects, a wireless communication device may use a first subchannel as an anchor in a primary carrier for interlaced channel access over a secondary carrier. In other words, the first subchannel may be, for example, a CA subchannel such as subchannel 0 906 and/or subchannel 5 916 of FIG. 9. The wireless communication device may calculate a first channel occupancy ratio (CR) that is associated with a first packet transmitted over the first subchannel using a first weighting factor that is greater than 1. The wireless communication device may identify a second subchannel that is not an anchor in the primary carrier for interlaced channel access over the secondary carrier. For example, the second subchannel may be any of non-CA subchannel 1 908, non-CA subchannel 2 910, non-CA subchannel 3 912, non-CA subchannel 14 914, and/or any of non-CA subchannels 6-12 of FIG. 9. The wireless communication device may calculate a second CR that is associated with a second packet transmitted in the second subchannel. The wireless communication device may thereafter avoid competition for access to the first subchannel based on a difference between the first CR that was calculated with the weighting factor that is greater than 1 and the second CR.

According to some aspects, the CA subchannel may include only sidelink control, while according to other aspects the CA subchannel may include sidelink control and sidelink traffic.

Figure 10A:
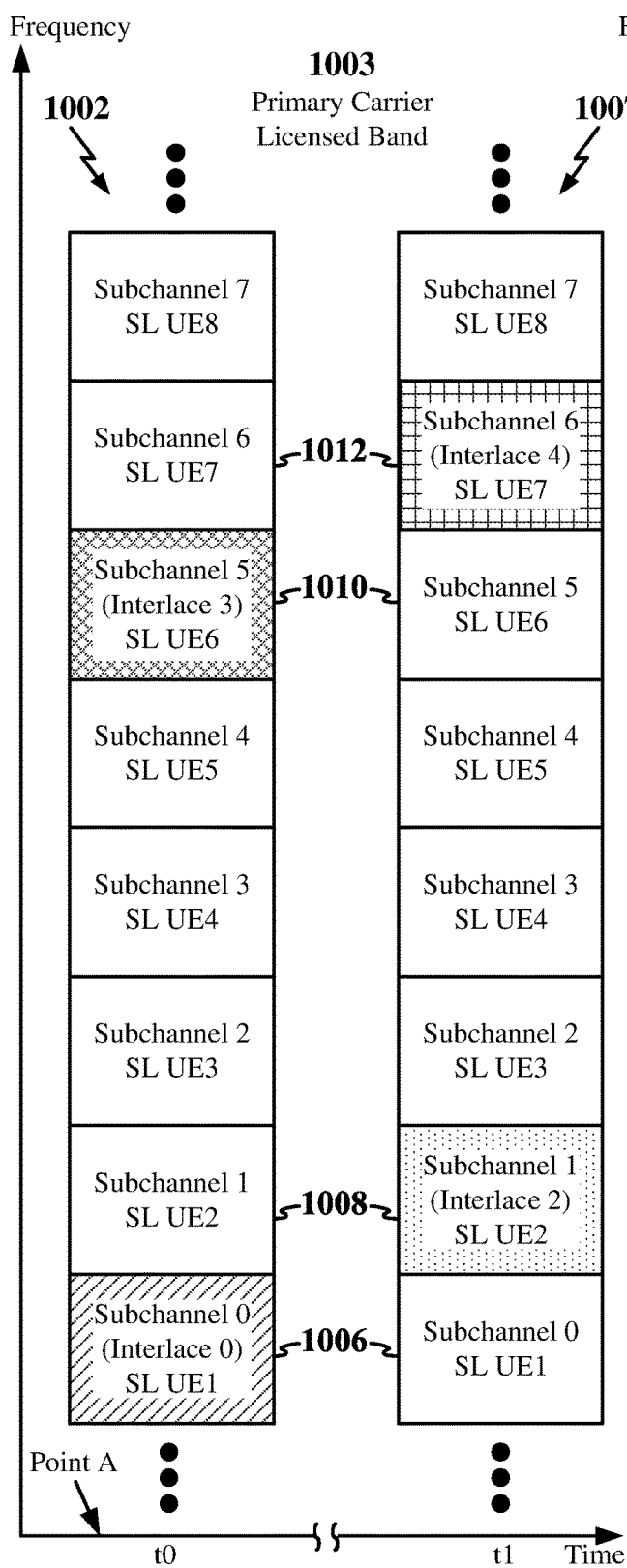
FIG. 10A is an example of a plurality subchannels in a licensed band according to some aspects.
Figure 10B:
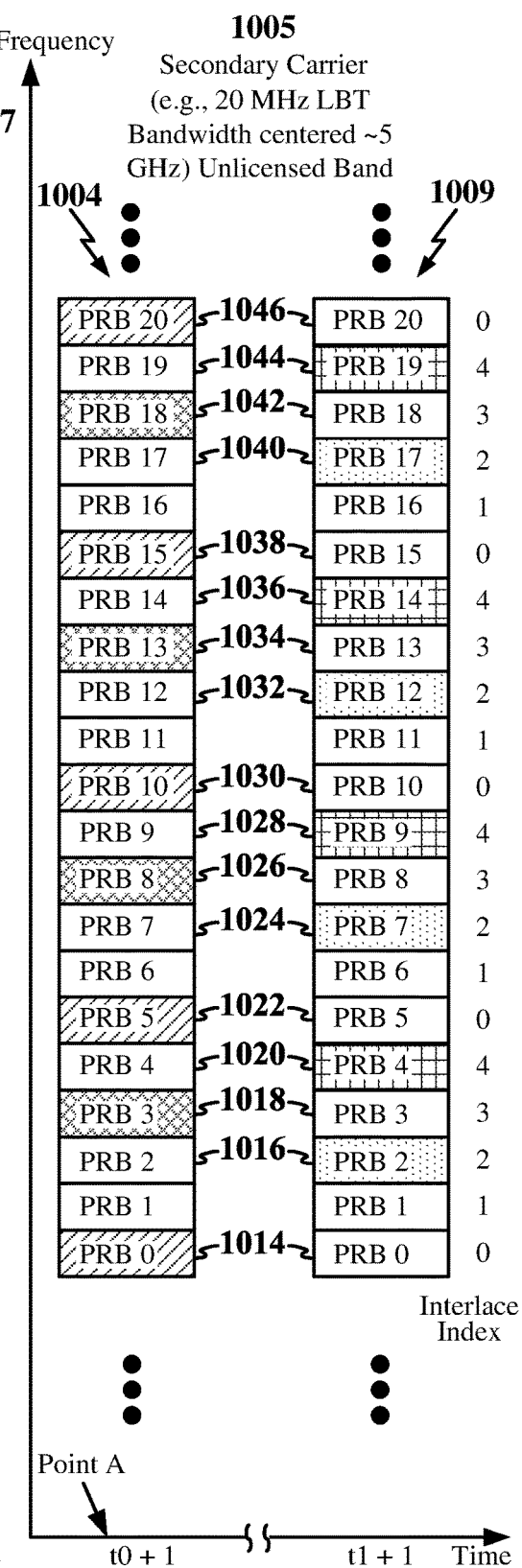
FIG. 10B is an example of a plurality of resource blocks in an unlicensed band according to some aspects.

FIG. 10A is an example of a plurality subchannels 1002, 1007 in a licensed band according to some aspects. FIG. 10B is an example of a plurality of resource blocks 1004, 1009 (e.g., physical resource blocks) in an unlicensed band according to some aspects. FIG. 10A and FIG. 10B together constitute FIG. 10.

Each of the plurality of subchannels 1002 of FIG. 10A occur at time t0. Each of the plurality of subchannels 1007 of FIG. 10A occur at time t1. Each of the plurality of physical resource blocks 1004 of FIG. 10B occur at time t0+1. Each of the plurality of physical resource blocks 1009 of FIG. 10B occur at time t1+1. The plurality of subchannels 1002 of FIG. 10A at time t0 may be associated with the plurality of physical resource blocks 1004 of FIG. 10B at time t0+1. The plurality of subchannels 1007 of FIG. 10A at time t1 may be associated with the plurality of physical resource blocks 1009 of FIG. 10B at time t1+1. The time t0 is less than t1. The times t0 and t1 may be contiguous; however, they are not necessarily contiguous. The illustrations of FIG. 10A and FIG. 10B are illustrative and non-limiting.

The lowest frequency on the frequency axis in FIG. 10 is identified as "Point A." According to some aspects, Point A may represent a center frequency of a lowest subcarrier in the frequency domain. Point A may be used as common reference point for various subchannels and/or resource blocks. For example, the lowest subchannel (subchannel 0 1006) of FIG. 10A is spaced apart from Point A by a first predetermined value. The lowest physical resource block (PRB 0 1014) of FIG. 10B is spaced apart from Point A by a second predetermined value. The first predetermined value and the second predetermined value may be greater than, equal to, or lesser than the other.

The duration (in the time domain) the plurality of subchannels 1002, 1007 and the plurality of physical resource blocks 1004, 1009 may be the same or different. By way of example, either or both of the durations may be a slot (e.g., first slot 612, second slot 624, third slot 626, or fifth slot 628 of FIG. 6), or may be any duration, such as, for example, a subframe, a frame, or any other duration without limitation.

Wireless communication devices, for example, similar to wireless communication device 500 may each perform an access procedure to gain access to and to occupy any of the plurality of subchannels 1002, 1007. At time t0, subchannel 0 1006 and subchannel 5 1010 may be referred to as CA subchannels or SL subchannels. By way of example and without limitation, at t0, SL UE1 may occupy subchannel 0 1006, SL UE2 may occupy subchannel 1 1008, SL UE6 may occupy subchannel 5 1010 and SL UE7 may occupy subchannel 6 1012.

However, at time t0, only subchannel 0 1006 and subchannel 5 1010 may be referred to as CA subchannels or SL subchannels. This is because, at time t0, subchannel 0 1006 serves as an anchor for interlaced channel access over the secondary carrier 1005 with interlace 0. Specifically, subchannel 0 1006 may be preconfigured to correspond with interlace 0 of FIG. 10B at time t0+1. This is because, at time t0+1, in subchannel 0 1006 at time t0 serving as anchor point for PRB 0 1014, PRB 5 1022, PRB 10 1030, PRB 15 1038 and PRB 20 1046. Likewise, at time t0 subchannel 5 1010 serves as an anchor for interlaced channel access over the secondary carrier 1005 with interlace 3. Specifically, subchannel 5 1010 may be preconfigured to correspond with interlace 3 of FIG. 10B at time t0+1. This is because, at time t0+1 in subchannel 5 1010 at time t0 serving as anchor point for PRB 3 1018, PRB 8 1026, PRB 13 1034, and PRB 18 1042.

The mapping from CA subchannels in primary carrier 1003 may be time-varying according to a pattern as shown by comparison of the plurality of subchannels 1002 at time t0 and the same plurality of subchannels 1007 at time t1. In the example of FIG. 10A, although subchannel 0 1006 and subchannel 5 1010 were both CA subchannels at time t0, they are no longer CA subchannels at time t1. Instead, according to a patter, subchannel 1 1008 and subchannel 6 1012 are CA subchannels at time t1. This is because, at time t1 subchannel 1 1008 serves as an anchor for interlaced channel access over the secondary carrier 1005 with interlace 2. Specifically, subchannel 1 1008 may be preconfigured to correspond with interlace 2 of FIG. 10B at time t1+1. This is because, at time t1+1 in subchannel 1 1008 at time t1 serving as anchor point for PRB 2 1016, PRB 57 1024, PRB 12 1032, and PRB 17 1040. Likewise, at time t1 subchannel 6 1012 serves as an anchor for interlaced channel access over the secondary carrier 1005 with interlace 4. Specifically, subchannel 6 1012 may be preconfigured to correspond with interlace 4 of FIG. 10B at time t1+1. This is because, at time t1+1 in subchannel 6 1012 at time t1 serving as anchor point for PRB 4 1020, PRB 9 1028, PRB 14 1036, and PRB 19 1044.

Accordingly, as described above, the wireless communication device may map from CA subchannels in the primary carrier 1003, according to a time-varying pattern. The time varying pattern may be preconfigured, similar to pre-configuration of interlaces, described earlier. According to some aspects, subchannels of a primary band including the first subchannel may be mapped, according to a time varying pattern, to pluralities of physical resource blocks in the secondary carrier.

In some examples, the wireless communication device may identify a primary carrier including the first subchannel and send hybrid automatic repeat request (HARQ) feedback of the secondary carrier over the primary carrier. The wireless communication device may send the HARQ feedback during a feedback opportunity of the first subchannel. The feedback opportunity may occur during a physical sidelink feedback channel opportunity. In one example, the wireless communication device may send the HARQ feedback of the secondary carrier over the primary carrier as code division multiplexed (CDM) message in the sidelink control.

A wireless communication device may report a channel quality indicator (QCI) and/or a rank indicator (RI) of the secondary carrier with CQI/RI of the first subchannel. According to some aspects, the reporting the CQI/RI of the secondary carrier with CQI/RI of the first subchannel may be sent in a medium access control element (MAC-CE) associated with the first subchannel.

According to some aspects, the wireless communication device may determine a first priority value associated with a sidelink control packet to be transmitted as the sidelink control in the first subchannel, determine a second priority value associated with a sidelink traffic packet, and transmit the sidelink traffic packet in the sidelink traffic if the second priority value is equal to the first priority value.

The wireless communication device may determine a first priority value, associated with a sidelink control packet to be transmitted as the sidelink control in the first subchannel, where the first priority value is selected from a closed set of values, determine a second priority value associated with a sidelink traffic packet, where the second priority value is selected from the closed set of values, determine a third priority value, relative to the first priority value, which may be indicative of lesser priority than the first priority value, and transmit the sidelink traffic packet in the sidelink control if the second priority value is greater than or equal to the third priority value.

The wireless communication device may also transmit a sidelink traffic packet in the sidelink traffic without regard to priority of the sidelink traffic packet.

According to some aspects, the wireless communication device may conduct load-balancing between a primary carrier including the first subchannel and the secondary carrier based on a channel busy ratio (CBR) determined for the primary carrier. Still further, according to some aspects, the load-balancing may further include conducting the load-balancing between a primary carrier including the first subchannel and the secondary carrier based on a channel busy ratio (CBR) determined for the primary carrier. In some examples, the conducting load-balancing may further include determining if the CBR exceeds a threshold and, if the CBR exceeds the threshold, determining to transmit a sidelink traffic packet in the sidelink traffic based on a determination of at least one of: whether a priority of the sidelink traffic packet is equal to a sidelink control packet, whether the priority of the sidelink traffic packet is within a predetermined delta of the sidelink control packet, or whether no priority of both the sidelink traffic packet is within a predetermined delta of the sidelink control packet. For example, for one CBR level over the primary carrier, the wireless communication device may transmit a packet over the secondary carrier if, for example, the priority of the sidelink control and sidelink traffic are equal, the priority of the sidelink traffic is slightly relaxed from that of the sidelink control (e.g., is less than a predetermined amount less than the priority of the sidelink control, or the priority of the sidelink control and sidelink traffic are not to be considered. For example, when CBR in primary is large, the wireless communication device may be preconfigured to ignore any determinations of priority and off-load traffic to the secondary carrier. As used herein, CBR may be measured or calculated over a TX Pool.

According to some aspects, the wireless communication device may seek access to the secondary carrier by deriving load-based equipment (LBE) frame timing over the unlicensed band from timing in the licensed band. According to still other aspects, the wireless communication device may seek access to the secondary carrier by using a load-based equipment (LBE) listen before talk (LBT) procedure to seek the access to the secondary carrier during an idle interval that at least partially overlaps with the symbol gap.

Figure 11:
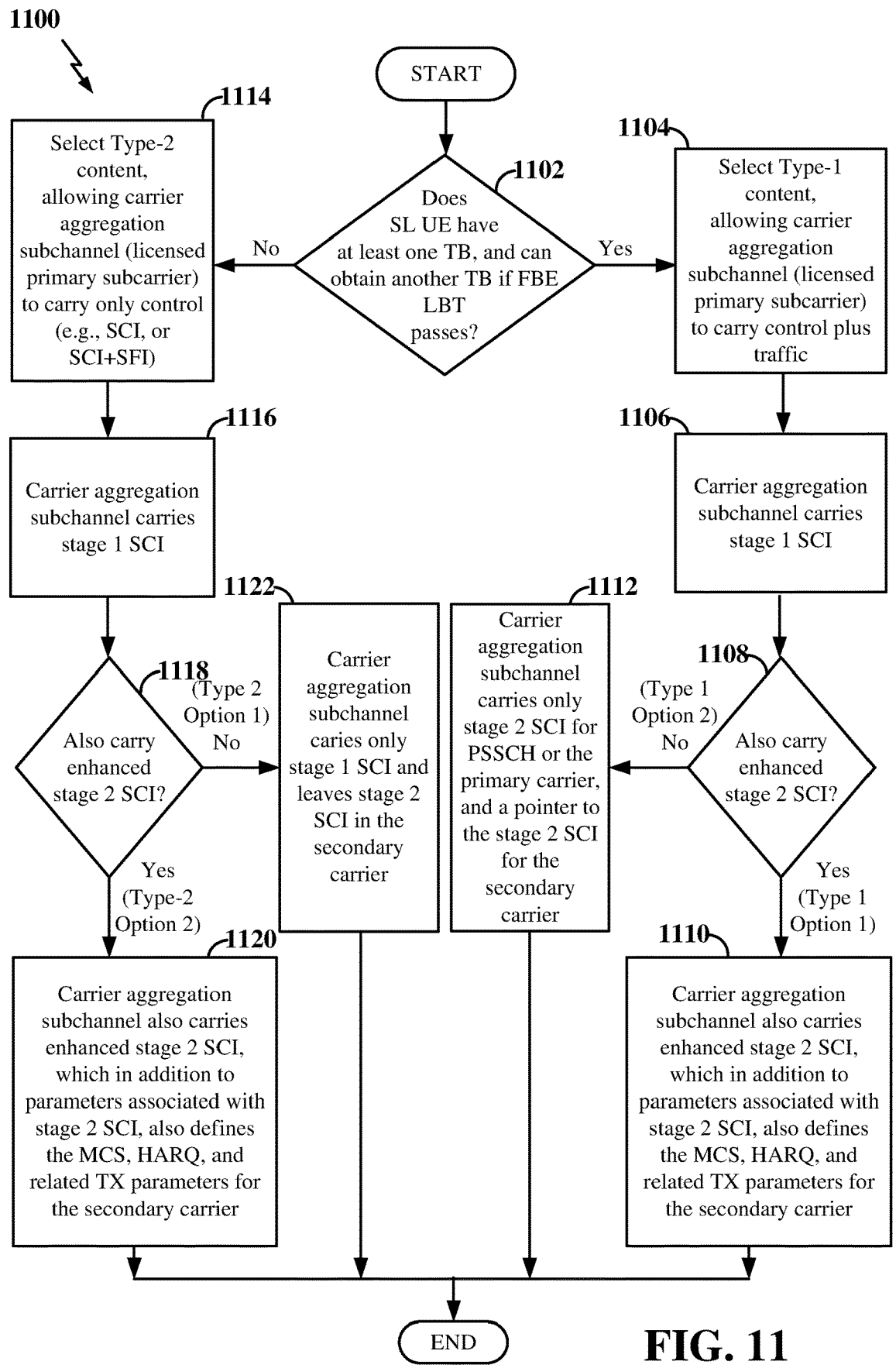
FIG. 11 is a flow diagram used by a wireless communication device to determine if content of a carrier aggregation subchannel (e.g., subchannels of a primary channel in the licensed band) should include control plus traffic or only control according to some aspects.

FIG. 11 is a flow diagram used by a wireless communication device to determine if content of a carrier aggregation subchannel (e.g., subchannels of a primary channel in the licensed band) should include control plus traffic or only control according to some aspects.

At block 1102, the wireless communication device determines if it has at least one transmission block (TB) and can opportunistically obtain another TB if it passes the FBE LBT access control process. If the wireless communication device determines that it has at least one TB and can opportunistically obtain another TB if it passes the FBE LBT access control process, the process passes to block 1104. At block 1104, the wireless communication device selects Type-1 content, allowing the carrier aggregation subchannel (e.g., the in the licensed band) to carry control plus traffic. Thereafter, at block 1106, the carrier aggregation subchannel carries the stage 1 SCI. Thereafter, the wireless communication device determines if the carrier aggregation subchannel should also carry an enhanced stage 2 SCI at block 1108. If the wireless communication device determines, at block 1108, that the carrier aggregation subchannel should also carry an enhanced stage 2 SCI, then, at block 1110, the carrier aggregation subchannel is made to carry the enhanced stage 2 SCI, which in addition to parameters associated with a nominal stage 2 SCI, also defines the modulation coding scheme (MCS), HARQ, and related TX parameters for the secondary carrier. Thereafter, the process 1100 may end.

Returning to block 1108, if the wireless communication device determines, at block 1108, that the carrier aggregation subchannel should not also carry an enhanced stage 2 SCI, then, at block 1112, the carrier aggregation subchannel is made to carry only stage 2 SCI for PSSCH or the primary carrier, and a pointer to the stage 2 SCI for the secondary carrier. Thereafter, the process 1100 may end.

Returning to block 1102, if the wireless communication device determines that it does not have at least one TB and/or cannot opportunistically obtain another TB if it passes the FBE LBT access control process, the process passes to block 1114. At block 1114, the wireless communication device selects type-2 content, allowing the carrier aggregation subchannel (e.g., a subchannel of a primary carrier in the licensed band) to carry only control (e.g., SCI, or SCI plus sidelink feedback information (SFI)). According to some aspect, if the type-2 content is employed, then the primary carrier may be a relatively small size, as it is only carrying data. Thereafter, at block 1116, the carrier aggregation subchannel carries the stage 1 SCI. Thereafter, the wireless communication device determines if the carrier aggregation subchannel should also carry an enhanced stage 2 SCI at block 1118. If the wireless communication device determines, at block 1118, that the carrier aggregation subchannel should also carry an enhanced stage 2 SCI, then, at block 1120, the carrier aggregation subchannel is made to carry the enhanced stage 2 SCI for TX over secondary carrier. Thereafter, the process 1100 may end.

Returning to block 1118, if the wireless communication device determines, at block 1118, that the carrier aggregation subchannel should not also carry an enhanced stage 2 SCI, then, at block 1122, the carrier aggregation subchannel is made to carry only the stage 1 SCI and leave the stage 2 SCI in the secondary carrier. Thereafter, the process 1100 may end.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-3 and/or 5 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. As used the word "or" and the concept of "alternatives" may be represented herein by the "/" symbol. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method of wireless communication in a wireless communication network, the method comprising, at a wireless communication device:
    occupying a slot in a first subchannel, wherein the first subchannel comprises a sidelink subchannel in a licensed band;
    transmitting sidelink control in the first subchannel during the slot, except during a symbol gap indicated to include at least a last symbol of a plurality of symbols supported by the slot;
    seeking access to a secondary carrier in an unlicensed band wherein the seeking access to the secondary carrier further comprises synchronizing a first channel access to the secondary carrier in the unlicensed band, based on a second channel access to the first subchannel in the licensed band; and
    transmitting sidelink traffic in the secondary carrier upon receiving the access to the secondary carrier.

2. The method of wireless communication of claim 1, wherein the seeking access to the secondary carrier in the unlicensed band further comprises:
    deriving frame-based equipment (FBE) frame timing over the unlicensed band from timing in the licensed band.

3. The method of wireless communication of claim 1, wherein the seeking access to the secondary carrier in the unlicensed band further comprises:
    using a frame-based equipment (FBE) listen before talk (LBT) procedure to seek access to the secondary carrier during an idle interval that at least partially overlaps with the symbol gap.

4. The method of wireless communication of claim 1, wherein the seeking access to the secondary carrier in the unlicensed band further comprises:
    seeking the access to the secondary carrier in the unlicensed band during the symbol gap.

5. The method of wireless communication of claim 1, further comprising:
    identifying a primary carrier that includes the first subchannel; and
    monitoring only the primary carrier for sidelink control.

6. The method of wireless communication of claim 1, further comprising:
    aggregating the sidelink control and the sidelink traffic to a primary carrier and the secondary carrier, respectively;
    designating the licensed band to include the primary carrier; and
    designating the unlicensed band to include the secondary carrier.

7. The method of wireless communication of claim 1, further comprising:
    carrying stage 1 sidelink control information over the first subchannel; and
    carrying enhanced stage 2 sidelink control information including at least one of modulation and coding scheme (MCS), hybrid automatic repeat request (HARQ), or transmission (TX) parameters for the secondary carrier over the first subchannel.

8. The method of wireless communication of claim 1, further comprising:
    mapping the first subchannel in a primary carrier to a plurality of interlaced resource blocks in the secondary carrier.

9. The method of wireless communication of claim 1, wherein the wireless communication device has one transmission block remaining and can obtain another transmission block upon receiving the access to the secondary carrier, the method further comprising:
    transmitting the sidelink control and the sidelink traffic in the first subchannel.

10. The method of wireless communication of claim 9, wherein the sidelink control comprises an enhanced stage 2 sidelink control information (eSCI-2) message that defines at least one of a modulation and coding scheme (MCS) of the secondary carrier, hybrid automatic repeat request (HARQ) feedback of the secondary carrier, or a transmission (TX) parameter for the secondary carrier.

11. The method of wireless communication of claim 9, wherein the sidelink control comprises a first stage 2 sidelink control information (first SCI-2) message and a pointer to a second stage 2 SCI (second SCI-2) message carried over the secondary carrier.

12. The method of wireless communication of claim 1, further comprising:
    transmitting only sidelink control in the first subchannel.

13. The method of wireless communication of claim 12, wherein the sidelink control comprises a first stage 1 sidelink control information (first SCI-1) message and a pointer to a second stage 2 SCI (second SCI-2) message carried over the secondary carrier.

14. The method of wireless communication of claim 12, wherein the sidelink control comprises a stage one sidelink control information (SCI-1) message and an enhanced stage 2 sidelink control information (eSCI-2) message that defines at least one of a modulation and coding scheme (MCS) for the secondary carrier, hybrid automatic repeat request (HARQ) feedback for the secondary carrier, or a transmission (TX) parameter for the secondary carrier.

15. The method of wireless communication of claim 1, further comprising:
    using the first subchannel as an anchor in a primary carrier for interlaced channel access over the secondary carrier;
    obtaining a first channel occupancy ratio (CR) that is associated with a first packet transmitted over the first subchannel;
    identifying a second subchannel that is not an anchor in the primary carrier for interlaced channel access over the secondary carrier;
    obtaining a second CR, different from the first CR, which is associated with a second packet transmitted in the second subchannel;
    avoiding competition for access to the first subchannel based on a difference between the first CR and the second CR.

16. The method of wireless communication of claim 1, further comprising:
using the first subchannel as an anchor in a primary carrier for interlaced channel access over the secondary carrier;
calculating a first channel occupancy ratio (CR) that is associated with a first packet transmitted over the first subchannel using a weighting factor that is greater than 1;
identifying a second subchannel that is not an anchor in the primary carrier for interlaced channel access over the secondary carrier;
calculating a second CR that is associated with a second packet transmitted in the second subchannel; and
avoiding competition for access to the first subchannel based on a difference between the first CR that was calculated with the weighting factor that is greater than 1 and the second CR.

17. The method of wireless communication of claim 1, wherein subchannels of a primary band including the first subchannel are mapped, according to a time varying pattern, to pluralities of physical resource blocks in the secondary carrier.

18. The method of wireless communication of claim 1, further comprising:
identifying a primary carrier including the first subchannel; and
sending hybrid automatic repeat request (HARQ) feedback of the secondary carrier over the primary carrier.

19. The method of wireless communication of claim 1, further comprising:
reporting at least one of: a channel quality indicator (CQI) or a rank indicator (RI) of the secondary carrier with CQI/RI of the first subchannel.

20. The method of wireless communication of claim 1, further comprising:
determining a first priority value associated with a sidelink control packet to be transmitted as the sidelink control in the first subchannel;
determining a second priority value associated with a sidelink traffic packet; and
transmitting the sidelink traffic packet in the sidelink traffic if the second priority value is equal to the first priority value.

21. The method of wireless communication of claim 1, further comprising:
determining a first priority value, associated with a sidelink control packet to be transmitted as the sidelink control in the first subchannel, wherein the first priority value is selected from a closed set of values;
determining a second priority value associated with a sidelink traffic packet, wherein the second priority value is selected from the closed set of values;
determining a third priority value, relative to the first priority value, and indicative of lesser priority than the first priority value; and
transmitting the sidelink traffic packet in the sidelink control if the second priority value is greater than or equal to the third priority value.

22. The method of wireless communication of claim 1, further comprising:
transmitting a sidelink traffic packet in the sidelink traffic without regard to priority of the sidelink traffic packet.

23. The method of wireless communication of claim 1, further comprising:
conducting load-balancing between a primary carrier including the first subchannel and the secondary carrier based on a channel busy ratio (CBR) determined for the primary carrier.

24. The method of wireless communication of claim 23, wherein the conducting load-balancing further comprises:
determining if the CBR exceeds a threshold; and
if the CBR exceeds the threshold, determining to transmit a sidelink traffic packet in the sidelink traffic based on a determination of at least one of:
whether a priority of the sidelink traffic packet is equal to a sidelink control packet,
whether the priority of the sidelink traffic packet is within a predetermined delta of the sidelink control packet, or
whether no priority of both the sidelink traffic packet is within a predetermined delta of the sidelink control packet.

25. The method of wireless communication of claim 1, wherein the seeking access to the secondary carrier in the unlicensed band further comprises:
deriving load-based equipment (LBE) frame timing over the unlicensed band from timing in the licensed band.

26. The method of wireless communication of claim 1, wherein the seeking access to the secondary carrier in the unlicensed band further comprises:
using a load-based equipment (LBE) listen before talk (LBT) process to seek the access to the secondary carrier during an idle interval that at least partially overlaps with the symbol gap.

27. A wireless communication device in a wireless communication network, comprising:
a wireless transceiver;
a memory; and
a processor communicatively coupled to the wireless transceiver and the memory, wherein the processor and the memory are configured to:
occupy a slot in a first subchannel, wherein the first subchannel comprises a sidelink subchannel in a licensed band;
transmit sidelink control in the first subchannel during the slot, except during a symbol gap indicated to include at least a last symbol of a plurality of symbols supported by the slot;
seek access to a secondary carrier in an unlicensed band;
map the first subchannel in a primary carrier to a plurality of interlaced resource blocks in the secondary carrier; and
transmit sidelink traffic in the secondary carrier upon receiving the access to the secondary carrier.

28. An article of manufacture for use by a wireless communication device in a wireless communication network, the article comprising:
a non-transitory computer-readable medium having stored therein instructions executable by one or more processors of the wireless communication device to:
occupy a slot in a first subchannel, wherein the first subchannel comprises a sidelink subchannel in a licensed band;
carry stage 1 sidelink control information over the first subchannel; and
carry enhanced stage 2 sidelink control information including at least one of modulation and coding scheme (MCS), hybrid automatic repeat request (HARQ), or transmission (TX) parameters for the secondary carrier over the first subchannel;

transmit sidelink control in the first subchannel during the slot, except during a symbol gap indicated to include at least a last symbol of a plurality of symbols supported by the slot;
seek access to a secondary carrier in an unlicensed band; and
transmit sidelink traffic in the secondary carrier upon receiving the access to the secondary carrier.

* * * * *